(12) United States Patent
Patel

(10) Patent No.: US 11,468,468 B2
(45) Date of Patent: *Oct. 11, 2022

(54) METHOD AND SYSTEM FOR PROVIDING OFFERS FOR AUTOMATED RETAIL MACHINES VIA MOBILE DEVICES

(71) Applicant: PAYRANGE INC., Portland, OR (US)

(72) Inventor: Paresh K. Patel, Portland, OR (US)

(73) Assignee: PAYRANGE INC., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/216,399

(22) Filed: Mar. 29, 2021

(65) Prior Publication Data

US 2021/0357971 A1 Nov. 18, 2021

Related U.S. Application Data

(63) Continuation of application No. 16/029,483, filed on Jul. 6, 2018, now Pat. No. 10,963,905, which is a
(Continued)

(51) Int. Cl.
*G06Q 30/00* (2012.01)
*G06Q 30/02* (2012.01)
(Continued)

(52) U.S. Cl.
CPC ......... *G06Q 30/0237* (2013.01); *G06Q 20/18* (2013.01); *G06Q 20/325* (2013.01);
(Continued)

(58) Field of Classification Search
CPC .. G06Q 20/18; G06Q 20/325; G06Q 20/3276; G06Q 20/3278; G06Q 30/02;
(Continued)

(56) References Cited

U.S. PATENT DOCUMENTS 5,479,602 A 12/1995 Baecker et al.
5,844,808 A 12/1998 Konsmo et al.
(Continued)

FOREIGN PATENT DOCUMENTS

CN 105139196 A 12/2015
EP 1571607 A2 9/2005
(Continued)

OTHER PUBLICATIONS

Software Bring Big Change for College's Vending, Oct. 2009, Automatic Merchandiser (Year: 2009).*
(Continued)

*Primary Examiner* — Matthew L Hamilton
(74) *Attorney, Agent, or Firm* — Morgan, Lewis & Bockius LLP

(57) ABSTRACT

A mobile device with a display, processor(s), and memory: identifies a retail machine configured for wireless communications based on broadcasted information transmitted by the retail machine and including an identifier corresponding to the retail machine; transmits the identifier to a server and receives from the server an electronic communication including a promotional offer for products or services offered by the retail machine; displays the promotional offer; detects selection of a promotional offer; receives a notification from the retail machine that a product or service was provided by the retail machine for a user of the mobile device; transmits confirmation information associated with the notification to the server, receives promotion validation information from the server indicating validation of the promotional offer; and based on the promotion validation information, displays information confirming application of the promotional offer.

20 Claims, 22 Drawing Sheets

Related U.S. Application Data continuation of application No. 14/611,065, filed on Jan. 30, 2015, now Pat. No. 10,019,724.

(51) Int. Cl.
- *G06Q 30/06* (2012.01)
- *G06Q 20/32* (2012.01)
- *G06Q 20/38* (2012.01)
- *G06Q 20/18* (2012.01)

(52) U.S. Cl.
CPC ..... *G06Q 20/3276* (2013.01); *G06Q 20/3278* (2013.01); *G06Q 20/38215* (2013.01); *G06Q 30/02* (2013.01); *G06Q 30/0248* (2013.01); *G06Q 30/0253* (2013.01); *G06Q 30/0267* (2013.01); *G06Q 30/06* (2013.01)

(58) Field of Classification Search
CPC . G06Q 30/0253; G06Q 30/0267; G06Q 30/06
See application file for complete search history.

(56) References Cited

U.S. PATENT DOCUMENTS

| | | | |
|---|---|---|---|
| 5,880,733 | A | 3/1999 | Horvitz et al. |
| 5,892,900 | A | 4/1999 | Ginter et al. |
| 5,955,718 | A | 9/1999 | Levasseur |
| 6,056,194 | A | 5/2000 | Kolls |
| 6,390,269 | B1 | 5/2002 | Billington |
| 6,462,644 | B1 | 10/2002 | Howell |
| 6,505,095 | B1 | 1/2003 | Kolls |
| 6,584,309 | B1 | 6/2003 | Whigham |
| 6,743,095 | B2 | 6/2004 | Cole et al. |
| 6,793,134 | B2 | 9/2004 | Clark |
| 6,810,234 | B1 | 10/2004 | Rasanen |
| 7,085,556 | B2 | 8/2006 | Offer |
| 7,110,954 | B2 | 9/2006 | Yung et al. |
| 7,127,236 | B2 | 10/2006 | Khan |
| 7,131,575 | B1 | 11/2006 | Kolls |
| 7,455,223 | B1 | 11/2008 | Wilson |
| 7,458,510 | B1 | 12/2008 | Zhou |
| 7,464,867 | B1 | 12/2008 | Kolls |
| 7,672,680 | B1 | 3/2010 | Lee et al. |
| 7,690,495 | B1 | 4/2010 | Kolls |
| 7,721,958 | B2 | 5/2010 | Belfer et al. |
| 7,848,980 | B2 | 12/2010 | Carlson |
| 7,962,369 | B2 | 6/2011 | Rosenberg |
| 7,983,670 | B1 | 7/2011 | Elliott |
| 8,020,763 | B1 | 9/2011 | Kowalchyk |
| 8,059,101 | B2 | 11/2011 | Westerman |
| D669,899 | S | 10/2012 | Cheng et al. |
| 8,346,670 | B2 | 1/2013 | Hasson et al. |
| 8,356,754 | B2 | 1/2013 | Johnson et al. |
| 8,376,227 | B2 | 2/2013 | Hammad et al. |
| 8,396,589 | B2 | 3/2013 | Katzenstein Garibaldi |
| 8,412,626 | B2 | 4/2013 | Hirson et al. |
| 8,438,066 | B1 | 5/2013 | Yuen |
| 8,479,190 | B2 | 7/2013 | Sueyoshi et al. |
| 8,489,140 | B2 | 7/2013 | Weiner et al. |
| 8,517,766 | B2 | 8/2013 | Golko et al. |
| 8,548,426 | B2 | 10/2013 | Smith |
| 8,577,734 | B2 | 11/2013 | Treyz |
| 8,583,496 | B2 | 11/2013 | You et al. |
| 8,596,528 | B2 | 12/2013 | Fernandes et al. |
| 8,596,529 | B1 | 12/2013 | Kolls |
| 8,600,899 | B1 | 12/2013 | Davis |
| 8,606,702 | B2 | 12/2013 | Ruckart |
| 8,615,445 | B2 | 12/2013 | Dorsey et al. |
| 8,645,971 | B2 | 2/2014 | Carlson et al. |
| 8,700,530 | B2 | 4/2014 | Smith |
| 8,707,276 | B2 | 4/2014 | Hill et al. |
| 8,712,893 | B1 | 4/2014 | Brandmaier |
| 8,761,809 | B2 | 6/2014 | Faith et al. |
| 8,769,643 | B1 | 7/2014 | Ben Ayed |
| 8,788,341 | B1 | 7/2014 | Patel |
| 8,794,734 | B2 | 8/2014 | Drummond |
| 8,810,430 | B2 | 8/2014 | Proud |
| 8,819,659 | B2 | 8/2014 | Ramer et al. |
| 8,838,481 | B2 | 9/2014 | Moshfeghi |
| 8,850,421 | B2 | 9/2014 | Proud |
| 8,856,045 | B1 | 10/2014 | Patel et al. |
| 8,881,975 | B1 | 11/2014 | Matthews |
| 8,898,620 | B2 | 11/2014 | Eizenman et al. |
| 8,903,737 | B2 | 12/2014 | Cameron et al. |
| 9,001,047 | B2 | 4/2015 | Forstall |
| 9,037,492 | B2 | 5/2015 | White |
| 9,092,768 | B2 | 7/2015 | Breitenbach et al. |
| 9,210,247 | B2 | 12/2015 | Vance et al. |
| 9,262,771 | B1 | 2/2016 | Patel |
| 9,395,888 | B2 | 7/2016 | Schiplacoff et al. |
| 9,424,603 | B2 | 8/2016 | Hammad |
| 9,483,763 | B2 | 11/2016 | Van Os |
| 9,547,859 | B2 | 1/2017 | Patel |
| 9,875,473 | B2 | 1/2018 | Patel |
| 9,898,884 | B1 | 2/2018 | Arora et al. |
| 10,163,292 | B1 | 12/2018 | Romero |
| 10,210,501 | B2 | 2/2019 | Low et al. |
| 10,304,057 | B1 | 5/2019 | Powell |
| 10,423,949 | B2 | 9/2019 | Lyons et al. |
| 10,824,828 | B2 | 11/2020 | Ostri |
| 10,977,642 | B2 | 4/2021 | Khan |
| 2002/0016740 | A1 | 2/2002 | Ogasawara |
| 2002/0164953 | A1 | 11/2002 | Curtis |
| 2003/0089767 | A1 | 5/2003 | Kiyomatsu |
| 2003/0110097 | A1 | 6/2003 | Lei |
| 2003/0130902 | A1 | 7/2003 | Athwal |
| 2003/0158891 | A1 | 8/2003 | Lei et al. |
| 2003/0191811 | A1 | 10/2003 | Hashem |
| 2003/0206542 | A1 | 11/2003 | Holder |
| 2003/0236872 | A1 | 12/2003 | Atkinson |
| 2004/0049454 | A1 | 3/2004 | Kanno et al. |
| 2004/0117262 | A1 | 6/2004 | Berger et al. |
| 2004/0133653 | A1 | 7/2004 | Defosse |
| 2005/0043011 | A1 | 2/2005 | Murray |
| 2005/0080510 | A1 | 4/2005 | Bates |
| 2005/0101295 | A1 | 5/2005 | Rupp |
| 2005/0177798 | A1 | 8/2005 | Thomson et al. |
| 2005/0181804 | A1 | 8/2005 | Misikangas et al. |
| 2005/0232421 | A1 | 10/2005 | Simons et al. |
| 2005/0234776 | A1* | 10/2005 | Jacoves ............ G07F 13/025 705/14.38 |
| 2006/0052157 | A1 | 3/2006 | Walker et al. |
| 2006/0123335 | A1 | 6/2006 | Sanchez et al. |
| 2007/0050083 | A1 | 3/2007 | Signorelli et al. |
| 2007/0186105 | A1 | 8/2007 | Bailey |
| 2007/0187491 | A1 | 8/2007 | Godwin et al. |
| 2007/0227856 | A1 | 10/2007 | Gopel |
| 2007/0255653 | A1 | 11/2007 | Tumminaro |
| 2008/0033880 | A1 | 2/2008 | Fiebiger et al. |
| 2008/0126213 | A1 | 5/2008 | Robertson et al. |
| 2008/0141033 | A1 | 6/2008 | Ginter et al. |
| 2008/0154727 | A1 | 6/2008 | Carlson |
| 2008/0154735 | A1 | 6/2008 | Carlson |
| 2008/0163257 | A1 | 7/2008 | Carlson et al. |
| 2008/0167017 | A1 | 7/2008 | Wentker et al. |
| 2008/0167991 | A1 | 7/2008 | Carlson et al. |
| 2008/0183480 | A1 | 7/2008 | Carlson et al. |
| 2008/0201226 | A1 | 8/2008 | Carlson et al. |
| 2008/0208762 | A1 | 8/2008 | Arthur et al. |
| 2008/0249658 | A1 | 10/2008 | Walker |
| 2008/0254853 | A1 | 10/2008 | Wright et al. |
| 2008/0255947 | A1 | 10/2008 | Friedman |
| 2008/0319913 | A1 | 12/2008 | Wiechers |
| 2009/0037284 | A1 | 2/2009 | Lewis et al. |
| 2009/0076896 | A1 | 3/2009 | Dewitt |
| 2009/0099961 | A1 | 4/2009 | Ogilvy |
| 2009/0106160 | A1 | 4/2009 | Skowronek |
| 2009/0119190 | A1 | 5/2009 | Realini |
| 2009/0171682 | A1 | 7/2009 | Dixon et al. |
| 2009/0306818 | A1 | 12/2009 | Slagley et al. |
| 2009/0306819 | A1 | 12/2009 | Insolia |
| 2009/0313132 | A1 | 12/2009 | Kenna et al. |
| 2009/0327089 | A1 | 12/2009 | Kanno et al. |
| 2010/0061294 | A1 | 3/2010 | Proctor, Jr. |

(56) References Cited

U.S. PATENT DOCUMENTS

| | | |
|---|---|---|
| 2010/0094456 A1 | 4/2010 | Simpkins et al. |
| 2010/0198400 A1 | 8/2010 | Pascal |
| 2010/0276484 A1 | 11/2010 | Banerjee |
| 2010/0280956 A1 | 11/2010 | Chutorash |
| 2010/0312692 A1 | 12/2010 | Teicher |
| 2010/0320266 A1 | 12/2010 | White |
| 2010/0329285 A1 | 12/2010 | Stanton |
| 2011/0029405 A1 | 2/2011 | Cronin |
| 2011/0040686 A1 | 2/2011 | Carlson |
| 2011/0125561 A1 | 5/2011 | Marcus |
| 2011/0153436 A1 | 6/2011 | Krampe |
| 2011/0153442 A1 | 6/2011 | Krampe |
| 2011/0172848 A1 | 7/2011 | Breitenbach et al. |
| 2011/0178883 A1 | 7/2011 | Granbery |
| 2011/0225067 A1 | 9/2011 | Dunwoody |
| 2011/0238476 A1 | 9/2011 | Carr |
| 2011/0244799 A1 | 10/2011 | Roberts et al. |
| 2011/0251892 A1 | 10/2011 | Laracey |
| 2011/0251910 A1 | 10/2011 | Dimmick |
| 2011/0276636 A1 | 11/2011 | Cheng et al. |
| 2011/0289023 A1 | 11/2011 | Forster et al. |
| 2012/0011024 A1 | 1/2012 | Dorsey et al. |
| 2012/0016731 A1 | 1/2012 | Smith et al. |
| 2012/0029691 A1 | 2/2012 | Mockus et al. |
| 2012/0030047 A1 | 2/2012 | Fuentes |
| 2012/0036045 A1 | 2/2012 | Lowe et al. |
| 2012/0066096 A1 | 3/2012 | Penide |
| 2012/0078735 A1 | 3/2012 | Bauer et al. |
| 2012/0108173 A1 | 5/2012 | Hahm et al. |
| 2012/0136478 A1 | 5/2012 | Anand |
| 2012/0150742 A1 | 6/2012 | Poon et al. |
| 2012/0158172 A1 | 6/2012 | Wencslao |
| 2012/0160912 A1 | 6/2012 | Laracey |
| 2012/0197740 A1 | 8/2012 | Grigg et al. |
| 2012/0231844 A1 | 9/2012 | Coppinger |
| 2012/0246074 A1 | 9/2012 | Annamalai et al. |
| 2012/0253852 A1 | 10/2012 | Pourfallah |
| 2012/0254631 A1 | 10/2012 | Skillman et al. |
| 2012/0255653 A1 | 10/2012 | Chin |
| 2012/0258773 A1 | 10/2012 | Alvarez Rivera |
| 2012/0276845 A1 | 11/2012 | Wikander |
| 2012/0290472 A1 | 11/2012 | Mullen et al. |
| 2012/0296826 A1 | 11/2012 | Bergdale et al. |
| 2012/0303528 A1 | 11/2012 | Weiner et al. |
| 2012/0316963 A1 | 12/2012 | Moshfeghi |
| 2012/0330844 A1 | 12/2012 | Kaufman |
| 2013/0030931 A1 | 1/2013 | Moshfeghi |
| 2013/0054016 A1 | 2/2013 | Canter et al. |
| 2013/0054336 A1 | 2/2013 | Graylin |
| 2013/0054395 A1 | 2/2013 | Cyr et al. |
| 2013/0067365 A1 | 3/2013 | Shrufi et al. |
| 2013/0085835 A1 | 4/2013 | Horowitz |
| 2013/0100886 A1 | 4/2013 | Cherian |
| 2013/0110296 A1 | 5/2013 | Khoo |
| 2013/0117490 A1 | 5/2013 | Harriman |
| 2013/0117738 A1 | 5/2013 | Livingston et al. |
| 2013/0124289 A1 | 5/2013 | Fisher |
| 2013/0126607 A1 | 5/2013 | Behjat |
| 2013/0143498 A1 | 6/2013 | Niemi |
| 2013/0166448 A1 | 6/2013 | Narayanan |
| 2013/0185150 A1 | 7/2013 | Crum |
| 2013/0191789 A1 | 7/2013 | Calman |
| 2013/0217333 A1 | 8/2013 | Sprigg et al. |
| 2013/0246171 A1 | 9/2013 | Carapelli |
| 2013/0246364 A1 | 9/2013 | Bhavith |
| 2013/0267121 A1 | 10/2013 | Hsu |
| 2013/0267176 A1 | 10/2013 | Hertel et al. |
| 2013/0275303 A1 | 10/2013 | Fiore |
| 2013/0275305 A1 | 10/2013 | Duplan |
| 2013/0278622 A1 | 10/2013 | Sun et al. |
| 2013/0297422 A1 | 11/2013 | Hunter et al. |
| 2013/0311379 A1 | 11/2013 | Smith |
| 2013/0311382 A1 | 11/2013 | Fosmark et al. |
| 2013/0331985 A1 | 12/2013 | Felique |
| 2013/0332293 A1 | 12/2013 | Ran |
| 2013/0346305 A1 | 12/2013 | Mendes |
| 2014/0019367 A1 | 1/2014 | Khan et al. |
| 2014/0025958 A1 | 1/2014 | Calman |
| 2014/0032413 A1 | 1/2014 | Low |
| 2014/0040028 A1 | 2/2014 | King et al. |
| 2014/0040117 A1 | 2/2014 | Jain |
| 2014/0052524 A1 | 2/2014 | Andersen |
| 2014/0064116 A1 | 3/2014 | Linde et al. |
| 2014/0067542 A1 | 3/2014 | Everingham |
| 2014/0074714 A1 | 3/2014 | Melone et al. |
| 2014/0074723 A1 | 3/2014 | Kamat |
| 2014/0085046 A1 | 3/2014 | Shin et al. |
| 2014/0085109 A1 | 3/2014 | Stefik |
| 2014/0089016 A1 | 3/2014 | Smullin |
| 2014/0100977 A1 | 4/2014 | Davis |
| 2014/0122298 A1 | 5/2014 | Oyer |
| 2014/0136301 A1 | 5/2014 | Valdes |
| 2014/0136411 A1 | 5/2014 | Cho |
| 2014/0143055 A1 | 5/2014 | Johnson |
| 2014/0143074 A1 | 5/2014 | Kolls |
| 2014/0172179 A1 | 6/2014 | Baudin |
| 2014/0180852 A1 | 6/2014 | Kamat |
| 2014/0108108 A1 | 7/2014 | Artman |
| 2014/0188708 A1 | 7/2014 | Govindarajan et al. |
| 2014/0201066 A1 | 7/2014 | Roux et al. |
| 2014/0249995 A1 | 9/2014 | Ogilvy |
| 2014/0278989 A1 | 9/2014 | Calman |
| 2014/0279008 A1 | 9/2014 | Calman |
| 2014/0279101 A1 | 9/2014 | Duplan et al. |
| 2014/0279556 A1 | 9/2014 | Priebatsch |
| 2014/0289047 A1 | 9/2014 | Yee |
| 2014/0317611 A1 | 10/2014 | Wojcik et al. |
| 2014/0324627 A1 | 10/2014 | Haver |
| 2014/0351099 A1 | 11/2014 | Zhu |
| 2014/0361872 A1 | 12/2014 | Garcia et al. |
| 2014/0378057 A1 | 12/2014 | Ramon et al. |
| 2015/0006421 A1 | 1/2015 | Pearson |
| 2015/0051977 A1 | 2/2015 | Lyman |
| 2015/0073980 A1 | 3/2015 | Griffin et al. |
| 2015/0081462 A1 | 3/2015 | Ozvat et al. |
| 2015/0088698 A1 | 3/2015 | Ackerman |
| 2015/0100152 A1 | 4/2015 | Trevino et al. |
| 2015/0105901 A1 | 4/2015 | Joshi et al. |
| 2015/0120546 A1 | 4/2015 | Fernandes |
| 2015/0120555 A1 | 4/2015 | Jung |
| 2015/0149992 A1 | 5/2015 | Wade et al. |
| 2015/0154579 A1 | 6/2015 | Teicher |
| 2015/0169312 A1 | 6/2015 | Patel |
| 2015/0170131 A1 | 6/2015 | Patel |
| 2015/0170132 A1 | 6/2015 | Patel |
| 2015/0170136 A1 | 6/2015 | Patel |
| 2015/0178702 A1 | 6/2015 | Patel |
| 2015/0235202 A1 | 8/2015 | Zabala |
| 2015/0278811 A1 | 10/2015 | Lalchandani |
| 2015/0287085 A1 | 10/2015 | Windmueller |
| 2015/0302377 A1 | 10/2015 | Sweitzer |
| 2015/0317720 A1 | 11/2015 | Ramaratnam |
| 2015/0332029 A1 | 11/2015 | Coxe |
| 2015/0346994 A1 | 12/2015 | Chanyontpatananakul |
| 2015/0373537 A1 | 12/2015 | Toksvig |
| 2016/0019604 A1 | 1/2016 | Kobayashi |
| 2016/0063476 A1 | 3/2016 | Baldie |
| 2016/0086145 A1 | 3/2016 | Tsutsui |
| 2016/0092859 A1 | 3/2016 | Klingen |
| 2016/0196220 A1 | 7/2016 | Perez et al. |
| 2016/0232515 A1 | 8/2016 | Jhas |
| 2016/0292469 A1 | 10/2016 | Ianni |
| 2016/0335620 A1 | 11/2016 | Lyons et al. |
| 2017/0006656 A1 | 1/2017 | Nacer et al. |
| 2017/0193508 A1 | 1/2017 | Patel et al. |
| 2017/0193478 A1 | 7/2017 | Dhurka |
| 2018/0005220 A1 | 1/2018 | Laracey |
| 2018/0240096 A1 | 8/2018 | Patel |
| 2019/0244205 A1 | 8/2019 | Fieglein |

FOREIGN PATENT DOCUMENTS

| | | |
|---|---|---|
| EP | 2061001 A1 | 5/2009 |
| JP | 2002-183812 A | 6/2002 |

(56) References Cited

FOREIGN PATENT DOCUMENTS

| JP | 2003-242401 | A | 8/2003 |
|----|-------------|---|--------|
| JP | 2003-323662 | A | 11/2003 |
| JP | 2004-252640 | A | 9/2004 |
| JP | 2005-526325 | T | 9/2005 |
| JP | 2009-259226 | A | 11/2009 |
| JP | 2012-504273 | T | 2/2012 |
| WO | WO 2003/098561 | | 11/2003 |
| WO | WO 2007/015610 | A1 | 2/2007 |
| WO | WO 2008/083022 | A1 | 7/2008 |
| WO | WO 2008/083025 | A2 | 7/2008 |
| WO | WO 2008/083078 | A2 | 7/2008 |
| WO | WO 2008/083089 | A1 | 7/2008 |
| WO | WO 2008/083105 | A2 | 7/2008 |
| WO | WO 2008/083115 | A1 | 7/2008 |
| WO | WO 2008/083119 | A1 | 7/2008 |
| WO | WO 2009/070430 | A2 | 6/2009 |
| WO | WO 2013/132995 | A1 | 9/2013 |
| WO | WO 2013/177416 | A2 | 11/2013 |
| WO | WO 2014/093857 | A1 | 6/2014 |
| WO | WO 2016/123545 | A1 | 8/2016 |
| WO | WO 2017/010936 | A1 | 1/2017 |
| WO | WO 2017/143079 | A1 | 8/2017 |

OTHER PUBLICATIONS

@RobocopyEs, posted Oct. 11, 2014, retrieved Feb. 13, 2018, <URL:https://twitter.com/robocopyes> 2 pgs.
Adams, How can stationary kiosks thrive in a mobile world?, American Banker, 2012.
Balan et al., mFerio: the design and evaluation of a peer-to-peer mobile payment system, Jun. 2009, 14 pgs.
Balfe et al., e-EMV: emulating EMV for internet payments with trusted computing Technologies, Oct. 2008, 12 pgs.
Bing, Bing Images Search: "dongle", http://www.bing.com/images/search?q=dongle&FORM+HDRSC2, Dec. 5, 2013, 8 pgs.
Carlson, Specification, U.S. Appl. No. 60/871,898, filed Dec. 26, 2006, 169 pgs.
Frolick, Assessing M-Commerce Opportunities, Auerbach Publications Inc., Information Systems Management, Spring 2004.
Google, Chromecast, htttp://www.google.com/intl/devices/chromecast/, Dec. 12, 2013, 4 pgs.
How to Pay the New Way, youtube, Apr. 5, 2018, 4 pgs.
How will Apple's new mobile wallet Passbook impact other mobile wallets?, posted Jun. 13, 2012, retrieved Feb. 13, 2018 from <URL:https://www.quora.com/How-will-Apples-new-mobile-wallet-Passbook-impact-other-mobile-wallets>, 5 pgs.
Kadambi et al., Near-Field Communication-based Secure Mobile Payment Sendee, Aug. 2009, 10 pgs.
Madlmayr et al., Near Field Communication Based Mobile Payment System, Austrian Research Funding Agency, Project 811408, Mar. 6, 2008, 13 pgs.
Novotny, Applying RFID technology in the retail industry-benefits and concerns from the consumer's perspective, Institute of Economic Science, Eszterhazy Karoly College, Eger, Hungary, Retail Technologies for the 21 Century, innovation and competitiveness in the retail industry, 2015.
Nurel, Recent Developments in Wireless Network Systems, Izmir Institute of Technology, Sep. 2001, 280 pgs.
Patel, Final Office Action, U.S. Appl. No. 14/320,534, dated Mar. 2, 2018, 26 pgs.
Patel, Final Office Action, U.S. Appl. No. 14/320,534, dated Apr. 16, 2015, 21 pgs.
Patel, Final Office Action, U.S. Appl. No. 14/320,534, dated Nov. 30, 2016, 24 pgs.
Patel, Final Office Action, U.S. Appl. No. 14/321,717, dated Jun. 18, 2015, 22 pgs.
Patel, Final Office Action, U.S. Appl. No. 14/321,724, dated Oct. 8, 2015, 19 pgs.
Patel, Final Office Action, U.S. Appl. No. 14/321,724, dated Dec. 13, 2017, 22 pgs.
Patel, Final Office Action, U.S. Appl. No. 14/321,733, dated Nov. 14, 2014, 11 pgs.
Patel, Final Office Action, U.S. Appl. No. 14/335,762, dated Jun. 9, 2016, 15 pgs.
Patel, Final Office Action, U.S. Appl. No. 14/456,683, dated Jun. 8, 2015, 14 pgs.
Patel, Final Office Action, U.S. Appl. No. 14/458,192, dated Sep. 16, 2015, 26 pgs.
Patel, Final Office Action, U.S. Appl. No. 14/458,199, dated Jun. 24, 2015, 8 pgs.
Patel, Final Office-Action, U.S. Appl. No. 14/641,236, dated Mar. 11, 2016, 16 pgs.
Patel, Final Office Action, U.S. Appl. No. 14/968,703, dated Feb. 12. 2019, 22 pgs.
Patel, Final Office Action, U.S. Appl. No. 15/435,228, dated Oct. 2, 2020, 24 pgs.
Patel, Final Office Action, U.S. Appl. No. 15/893,514, dated Jul 22, 2021, 12 pgs.
Patel, Final Office Action, U.S. Appl. No. 15/956,741, dated Oct. 2, 2020, 12 pgs.
Patel, Notice of Allowance, U.S. Appl. No. 14/214,644, dated Jun. 10, 2014, 9 pgs.
Patel, Notice of Allowance, U.S. Appl. No. 14/321,733, dated Jun. 22, 2015, 8 pgs.
Patel, Notice of Allowance, U.S. Appl. No. 14/321,733, dated Feb. 27, 2015, 9 pgs.
Patel, Notice of Allowance, U.S. Appl. No. 14/335,762, dated Oct. 3, 2016, 7 pgs.
Patel, Notice of Allowance, U.S. Appl. No. 14/335,762, dated Mar. 30, 2015, 9 pgs.
Patel, Notice of Allowance, U.S. Appl. No. 14/456,683, dated Oct. 8, 2015, 15 pgs.
Patel, Notice of Allowance, U.S. Appl. No. 14/458,192, Oct. 12, 2017, 8 pgs.
Patel, Notice of Allowance, U.S. Appl. No. 14/458,199, dated Jan. 20, 2017, 9 pgs.
Patel, Notice of Allowance, U.S. Appl. No. 14/611,065, dated Mar. 26, 2018, 18 pgs.
Patel, Notice of Allowance, U.S. Appl. No. 14/614,336, dated Dec. 11, 2015, 8 pgs.
Patel, Notice of Allowance, U.S. Appl. No. 14/614,336, dated Nov. 25, 2015, 13 pgs.
Patel, Notice of Allowance, U.S. Appl. No. 14/968,703, dated Jun. 27, 2019, 10 pgs.
Patel, Notice of Allowance, U.S. Appl. No. 15/406,492, dated Mar. 11, 2020, 9 pgs.
Patel, Notice of Allowance, U.S. Appl. No. 15/435,228, dated Aug. 12, 2021, 9 pgs.
Patel, Notice of Allowance, U.S. Appl. No. 15/603,400, dated Dec. 18, 2019, 8 pgs.
Patel, Notice of Allowance, U.S. Appl. No. 15/603,400, dated Jun. 18, 2020, 5 pgs.
Patel, Notice of Allowance, U.S. Appl. No. 15/878,352, dated Oct. 23, 2020, 8 pgs.
Patel, Notice of Allowance, U.S. Appl. No. 16/029,483, dated Dec. 23, 2020, 21 pgs.
Patel, Notice of Allowance, U.S. Appl. No. 16/748,727, dated May 9, 2022, 16 pgs.
Patel, Notice of Allowance, U.S. Appl. No. 16/748,727, dated Jan. 20, 2022, 15 pgs.
Patel, Notice of Allowance, U.S. Appl. No. 16/750,477, dated Jan. 26, 2022, 14 pgs.
Patel, Notice of Allowance, U.S. Appl. No. 16/934,933, Mar. 31, 2021, 8 pgs.
Patel, Office Action, U.S. Appl. No. 14/320,534, dated Apr. 8, 2016, 21 pgs.
Patel, Office Action, U.S. Appl. No. 14/320,534, dated Oct. 29, 2014, 18 pgs.
Patel, Office Action, U.S. Appl. No. 14/321,717, dated Dec. 19, 2014, 16 pgs.
Patel, Office Action, U.S. Appl. No. 14/321,724, dated Mar. 13, 2017, 21 pgs.

(56) References Cited

OTHER PUBLICATIONS

Patel, Office Action, U.S. Appl. No. 14/321,724, dated May 15, 2015, 19 pgs.
Patel, Office Action, U.S. Appl. No. 14/321,733, dated Aug. 21, 2014, 9 pgs.
Patel, Office Action, U.S. Appl. No. 14/335,762, dated Dec. 10, 2014, 7 pgs.
Patel, Office Action, U.S. Appl. No. 14/335,762, dated Sep. 18, 2015, 13 pgs.
Patel, Office Action. U.S. Appl. No. 14/456,683, dated Jan. 2, 2015, 10 pgs.
Patel, Office Action, U.S. Appl. No. 14/458,192, dated Mar. 23, 2017, 26 pgs.
Patel, Office Action, U.S. Appl. No. 14/458,192, dated Jan. 30, 2015, 24 pgs.
Patel, Office Action, U.S. Appl. No. 14/458,199, dated Jan. 5, 2015, 7 pgs.
Patel, Office Action, U.S. Appl. No. 14/458,199, dated Mar. 28, 2016, 8 pgs.
Patel, Office Action, U.S. Appl. No. 14/611,065, dated Oct. 3, 2016, 19 pgs.
Patel, Office Action, U.S. Appl. No. 14/611,065, dated Jun. 13, 2017, 17 pgs.
Patel, Office Action, U.S. Appl. No. 14/614,336, dated May 27, 2015, 17 pgs.
Patel, Office Action, U.S. Appl. No. 14/641,236, dated Feb. 7, 2018, 19 pgs.
Patel, Office Action, U.S. Appl. No. 14/641,236, dated May 29, 2015, 10 pgs.
Patel, Office Action, U.S. Appl. No. 14/968,703, dated Aug. 7, 2018, 31 pgs.
Patel, Office Action, U.S. Appl. No. 15/406,492, dated Jul. 25, 2019, 16 pgs.
Patel, Office Action, U.S. Appl. No. 15/435,228, dated Mar. 26, 2020, 21 pgs.
Patel, Office Action, U.S. Appl. No. 15/603,400, dated Jun. 12, 2019, 10 pgs.
Patel, Office Action, U.S. Appl. No. 15/878,352, dated Jan. 24, 2020, 12 pgs.
Patel, Office Action, U.S. Appl. No. 15/893,514, dated Oct. 29, 2020, 17 pgs.
Patel, Office Action, U.S. Appl. No. 15/956,741, dated Apr. 22, 2020, 10 pgs.
Patel, Office Action, U.S. Appl. No. 15/956,741, dated Dec. 27, 2021, 10 pgs.
Patel, Office Action, U.S. Appl. No. 16/029,483, dated Apr. 27, 2020, 28 pgs.
Patel, Office Action, U.S. Appl. No. 16/681,673, dated Dec. 24, 2021, 20 pgs.
Patel, Office Action, U.S. Appl. No. 16/934,933, dated Oct. 28, 2020, 9 pgs.
PayRange Inc., Communication Pursuant to Article 94(3), EP 14828617.2, dated Dec. 19, 2017, 6 pgs.
PayRange Inc., Communication Pursuant to Article 94(3), EP 16706931.9, dated Jun. 29, 2018, 8 pgs.
PayRange Inc., Communication Pursuant to Rules 161(1) and 162, EP 14828617.2, dated Sep. 21, 2016, 2 pgs.
PayRange Inc., Communication Pursuant to Rules 161(1) and 162, EP 16706931.9, dated Sep. 21, 2017, 2 pgs.
PayRange Inc., Communication under Rule 71(3) EPC, EP 14828617.2, dated Nov. 19, 2020, 8 pgs.
PayRange Inc., Communication under Rule 71(3) EPC, EP 17708929.9, dated Jun. 12, 2020, 5 pgs.
PayRange Inc., European Search Report, EP 20203134.1, dated Feb. 9, 2021, 2 pgs.
PayRange Inc., European Search Report, EP 21165692.1, dated Sep. 14, 2021, 9 pgs.
PayRange Inc., IPRP, PCT/US2014/071284, Jun. 21, 2016, 6 pgs.
PayRange Inc., IPRP, PCT/US2016/015763, Aug. 1, 2017, 7 pgs.
PayRange Inc., IPRP, PCT/US2017/015676, Jul. 31, 2018, 9 pgs.
PayRange Inc., IPRP, PCT/US2017/018194, Aug. 21, 2018, 17 pgs.
PayRange Inc., IPRP, PCT/US2019/060777, May 11, 2021, 7 pgs.
PayRange Inc., ISR/WO, PCT/US2014/071284, Mar. 25, 2015, 9 pgs.
PayRange Inc., ISR/WO, PCT/US2016/015763, Apr. 8, 2016, 9 pgs.
PayRange Inc., ISR/WO, PCT/US2017/015676, Apr. 18, 2017, 11 pgs.
PayRange Inc., ISR/WO, PCT/US2017/018194, Apr. 12, 2017, 10 pgs.
PayRange Inc., ISR/WO, PCT/US2019/060777, Feb. 6, 2020, 11 pgs.
PayRange Inc., ISR/WO, PCT/US2021/042632, Nov. 17, 2021, 11 pgs.
PayRange Inc., Notice of Reasons for Rejection, JP 2017-527886, dated Aug. 29, 2019, 10 pgs.
PayRange Inc., Notice of Reasons for Rejection, JP 2018-543707, dated Sep. 4, 2020, 4 pgs.
PayRange Inc., Notice of Reasons for Rejection, JP 2020-101558, dated Oct. 7, 2021, 2 pgs.
PayRange Inc., Summons to Attend Oral Proceedings, EP 14828617.2, dated Apr. 2, 2020, 12 pgs.
PayRange New Product Launch, posted at youtube.com Jun. 27, 2015, © 2016 YouTube, LLC, [online], [site visited Mar. 2, 2016]. Available from Internet, <URL: https://www.youtube.com/watch?v=NTvvV03XFeg., 1 pg.
Raja, A Stochastic Game Theoretic Model for Expanding ATM Services. Https://ieeexplore.ieee.org/stamp/stamp.jsp?tp=&arnumber=7395687, 2015, 8 pgs.
Smart Vending Machine Demo at TechCrunch Disrupt 2013, posted at youtube.com Dec. 3, 2013, © 2016 YouTube, LLC, [online], [site visited Mar. 2, 2016]. Available from internet, ,URL: https://www.youtube.com/watch?v=XEz1H-gxLj8>.
Square Mobile Credit Card Processing for iPhone, iPod, iPad, posted at youtube.com, posting date Apr. 30, 2011, © 2016 YouTube, LLC, [online], [site visited Mar. 2, 2016]. Available from internet, <URL: https://www.youtube.com/watch?v=v6sKb3CFSKw>.

\* cited by examiner

METHOD AND SYSTEM FOR PROVIDING OFFERS FOR AUTOMATED RETAIL MACHINES VIA MOBILE DEVICES

PRIORITY CLAIM AND RELATED APPLICATION

This application is a continuation of U.S. patent application Ser. No. 16/029,483, filed Jul. 6, 2018, entitled "Method and System for Providing Offers for Automated Retail Machines Via Mobile Devices," which is a continuation of Ser. No. 14/611,065, filed Jan. 30, 2015, entitled "Method and System for Providing Offers for Automated Retail Machines Via Mobile Devices," now U.S. Pat. No. 10,019,724, issued on Jul. 10, 2018, both of which are hereby expressly incorporated by reference in their entirety.

This application is related to the following: U.S. Pat. No. 8,856,045, filed Mar. 14, 2014, entitled "Mobile-Device-to-Machine Payment Systems"; U.S. patent application Ser. No. 14/320,534, filed Jun. 30, 2014, entitled "Method and System for Authenticating Mobile Device-to-Machine Payments"; U.S. patent application Ser. No. 14/335,762, filed Jul. 18, 2014, entitled "Method and System for Performing Mobile Device-To-Machine Payments"; U.S. patent application Ser. No. 14/456,683, filed Aug. 11, 2014, entitled "Method and Device for Retrofitting an Offline-Payment Operated Machine to Accept Electronic Payments"; U.S. patent application Ser. No. 14/458,192, filed Aug. 12, 2014, entitled "Method and System for Retrofitting an Offline-Payment Operated Machine to Accept Electronic Payments"; and U.S. Provisional Patent Application No. 62/081,492, filed Nov. 11, 2014, entitled "Method and Device for Multi-Drop Bus Payment Peripheral Expansion," all of which are hereby incorporated by reference in their entireties.

TECHNICAL FIELD

The present application relates to the field of payment processing systems, and in particular, to a mobile-device-to-machine payment processing system over a non-persistent network connection.

BACKGROUND

Vending machines (or more broadly "automatic retail machines"), in the broadest sense, have been around for thousands of years. The first simple mechanical coin operated vending machines were introduced in the 1880s. Modern vending machines stock many different types of products including, but not limited to drinks (e.g., water, juice, coffee, and soda) and edible food products/items (e.g., snacks, candy, fruit, and frozen meals), as well as a wide variety of non-food items. In this fast paced world, vending machines are ubiquitous.

Vending machines are one type of "payment accepting unit" (payment accepting units are also referred to herein generically as "machines"). A payment accepting unit (or machine) is equipment that requires payment for the dispensing of products and/or services. In addition to vending machines, payment accepting units can also be other machines that require payment for the dispensing of a product and/or services including, but not limited to parking meters, toll booths, laundromat washers and dryers, arcade games, kiosks, photo booths, toll booths, transit ticket dispensing machines, and other known or yet to be discovered payment accepting units.

In using a payment accepting unit, a user will (1) approach the payment accepting unit, (2) determine from the face of the payment accepting unit the product (or service) he/she desires, (3) insert payment (e.g., coins, bills, or payment cards), and (4) input his/her selection into the payment accepting unit using a user interface (e.g., a series of buttons, a key pad, touch screen, or other input mechanism using, for example, the column and row at which a product is located). Based on the user's inputted selection, technology within the payment accepting unit provides the desired product (or service) to the user.

As the number of people with Internet-connected mobile devices proliferates, so does the variety of uses for such devices. Mobile payment is a logical extension. There is a large development effort around bringing mobile payment to the retail sector in an effort to not only provide options to the user, but also increased convenience.

SUMMARY

In some implementations, a method of providing and handling promotional offers for an automatic retail machine is performed at a mobile device (e.g., the mobile device 104, FIGS. 1-2) with a display, one or more processors, and memory. The method includes: displaying one or more promotional offers on the display; detecting a user input selecting a respective promotional offer of the one or more promotional offers; and initiating performance of a transaction with an automatic retail machine coupled with a payment module, where the transaction corresponds to purchase of a product stocked by the automatic retail machine. The method also includes: receiving a transaction completion notification from the payment module, where the transaction completion notification indicates that the product corresponding to the selected respective promotional offer was vended by the automatic retail machine; and, in response to receiving the transaction completion notification, providing a prompt to the user of the mobile device to obtain a product code for the vended product to validate the respective promotional offer. The method further includes: obtaining the product code for the vended product; after obtaining the product code, transmitting the product code to the server; and, in response to transmitting the product code: receiving promotion validation information from the server; and displaying the promotion validation information on the display, where the promotion validation information indicates whether the respective promotion offer was validated.

In some implementations, a mobile device (e.g., the mobile device 104, FIGS. 1-2) includes a display, one or more processors, and memory storing one or more programs for execution by the one or more processors, the one or more programs include instructions for performing, or controlling performance of, the operations of any of the methods described herein. In some implementations, a non-transitory computer readable storage medium storing one or more programs, the one or more programs comprising instructions, which, when executed by a mobile device (e.g., the mobile device 104, FIGS. 1-2) with one or more processors and a display, cause the computing device to perform, or control performance of, the operations of any of the methods described herein. In some implementations, a mobile device (e.g., the mobile device 104, FIGS. 1-2) includes means for performing, or controlling performance of, the operations of any of the methods described herein.

Various advantages of the present application are apparent in light of the descriptions below.

BRIEF DESCRIPTION OF THE DRAWINGS

The aforementioned features and advantages of the disclosed technology as well as additional features and advantages thereof will be more clearly understood hereinafter as a result of a detailed description of preferred implementations when taken in conjunction with the drawings.

To describe the technical solutions in the implementations of the present disclosed technology or in the prior art more clearly, the following briefly introduces the accompanying drawings required for describing the implementations or the prior art. Apparently, the accompanying drawings in the following description show merely some implementations of the present disclosed technology, and persons of ordinary skill in the art may still derive other drawings from these accompanying drawings without creative efforts.

Like reference numerals refer to corresponding parts throughout the several views of the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the implementations.

The following clearly and completely describes the technical solutions in the implementations of the present application with reference to the accompanying drawings in the implementations of the present application. Apparently, the described implementations are merely a part rather than all of the implementations of the present application. All other implementations obtained by persons of ordinary skill in the art based on the implementations of the present application without creative efforts shall fall within the protection scope of the present application.

Figure 1:
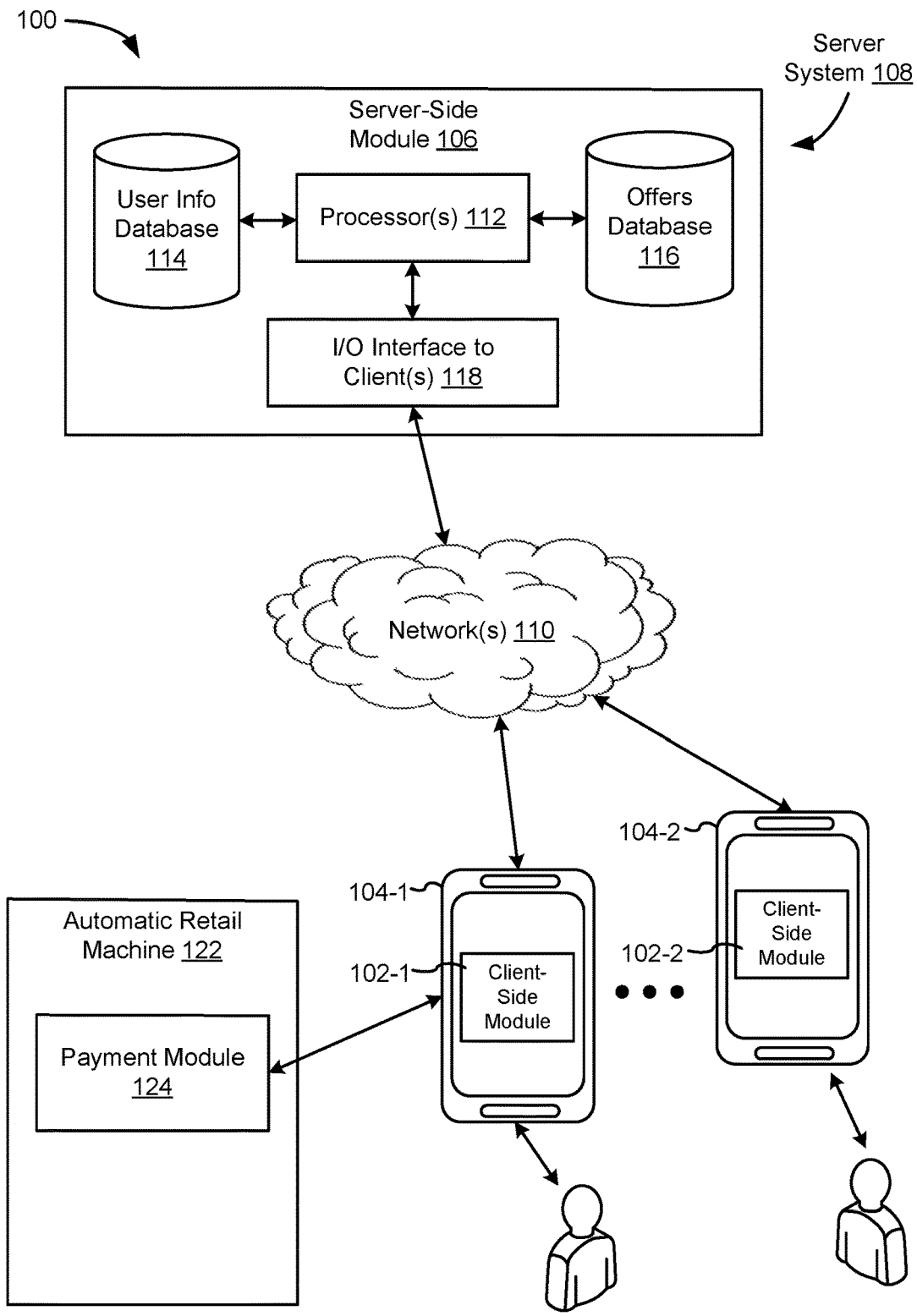
FIG. 1 is a block diagram of a payment processing system in accordance with some implementations.
Figure 7:
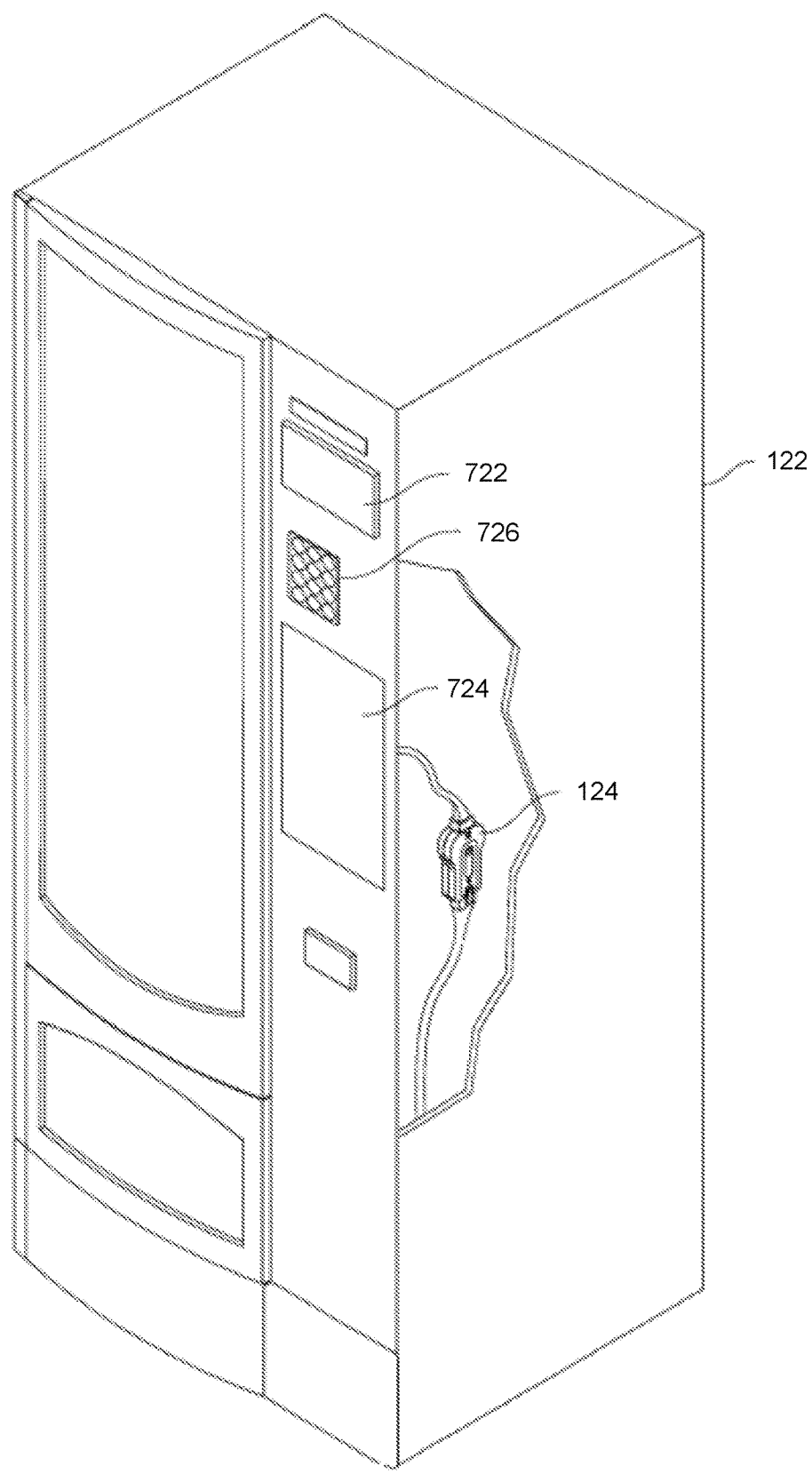
FIG. 7 is a perspective view of the payment module of FIG. 6A within the automatic retail machine of FIG. 4 in accordance with some implementations.
Figure 8:
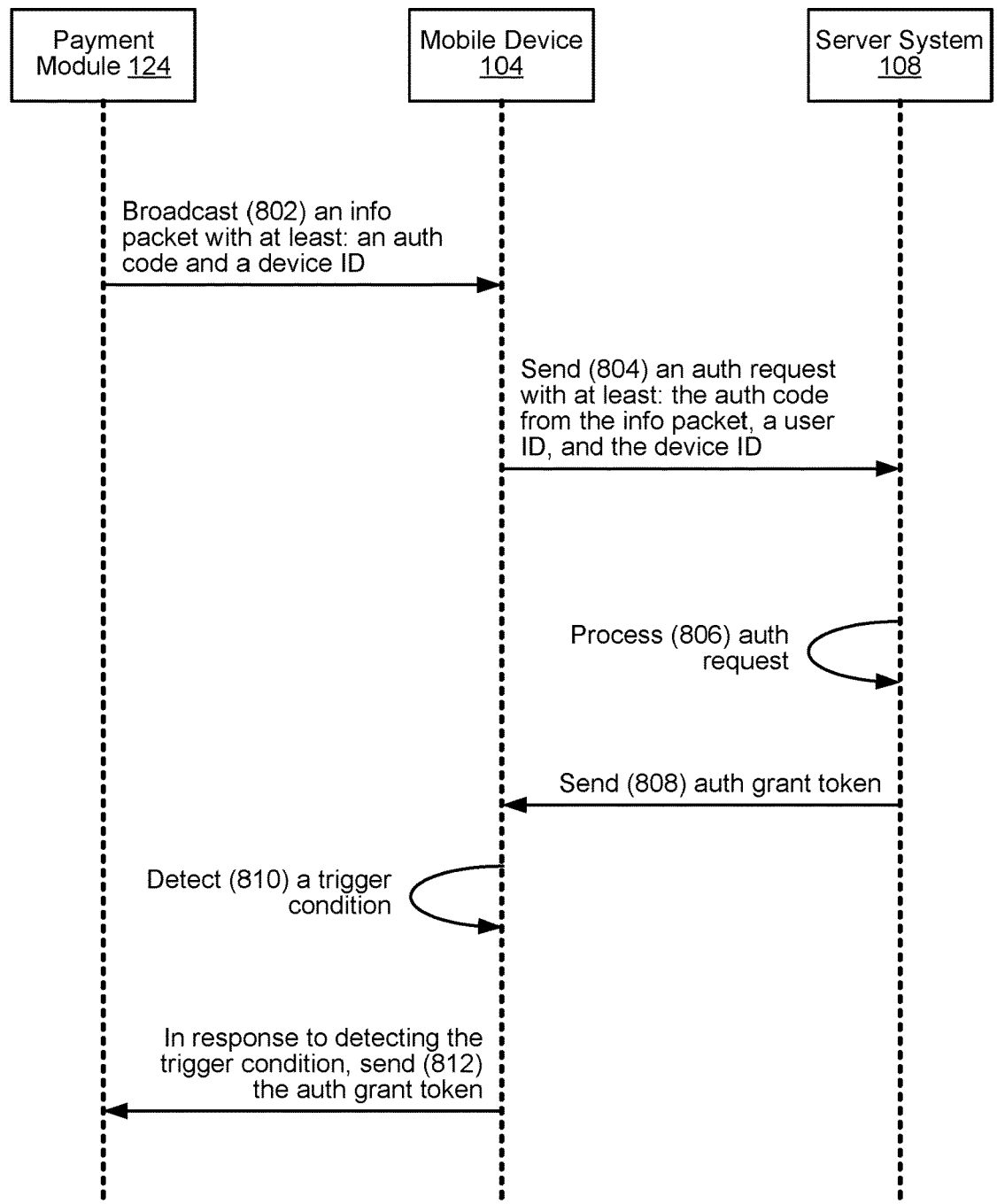
FIG. 8 is a schematic flow diagram of a process for initiating a transaction in accordance with some implementations.
Figure 9:
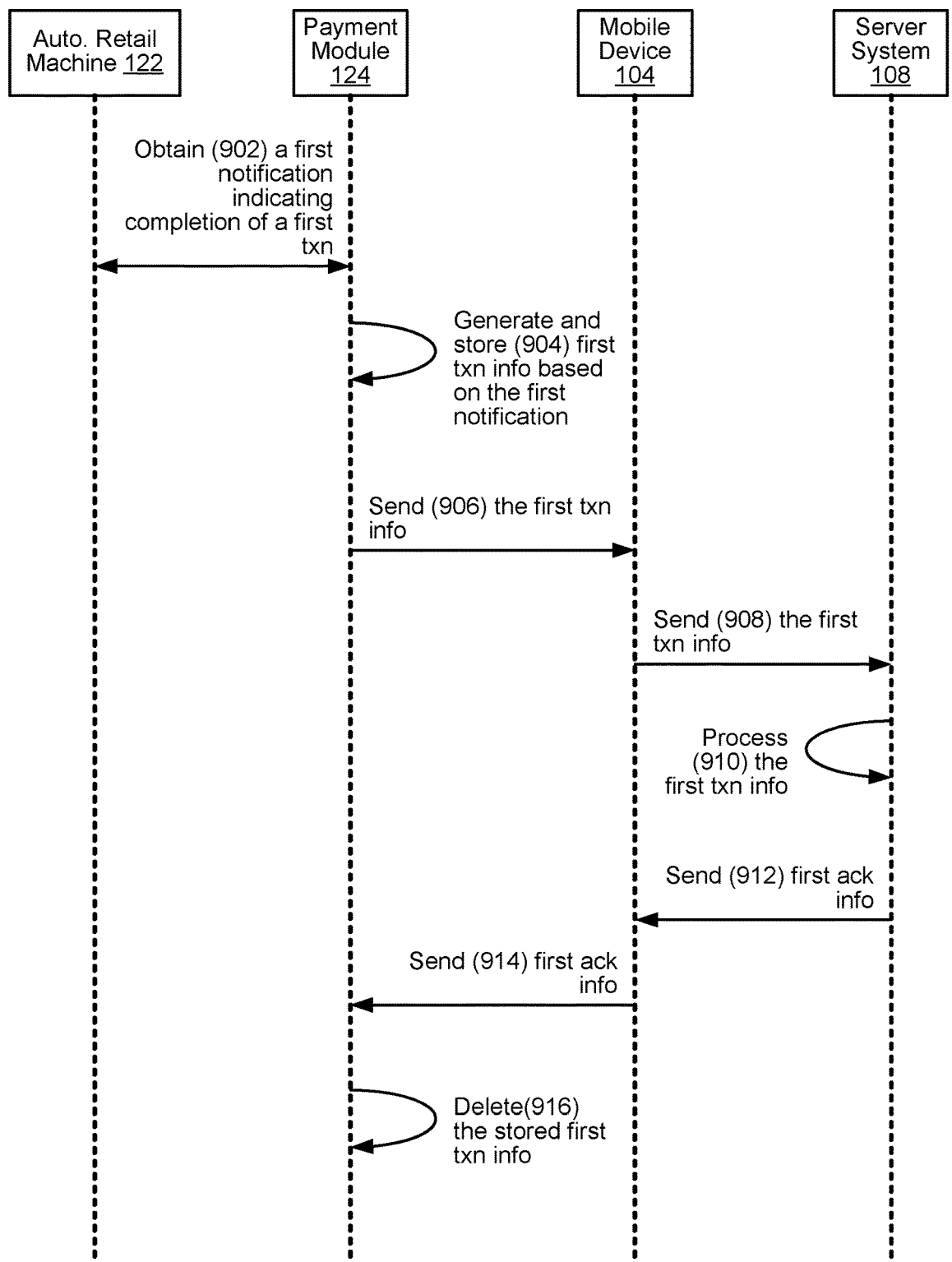
FIG. 9 is a schematic flow diagram of a process for acknowledging a transaction in accordance with some implementations.

FIG. 1 illustrates a payment processing system 100. FIGS. 2-5 illustrate example devices within the payment processing system 100. FIGS. 6A-6C and 7 show various views of the payment module 124 and the automatic retail machine 122. FIG. 8 illustrates a schematic flow diagram of a process 800 for initiating a transaction within the payment processing system 100. FIG. 9 illustrates a schematic flow diagram of a process 900 for acknowledging a transaction within the payment processing system 100. FIGS. 10A-10D illustrate data structures associated with initiating and performing transactions within the payment processing system 100. FIGS. 11A-11G illustrate example user interfaces for displaying promotional offers. FIGS. 12A-12C illustrate a flowchart diagram of a method 1200 of providing and handling promotional offers for an automatic retail machine. The user interfaces in FIGS. 11A-11G are used to illustrate the method in FIGS. 12A-12C.

Example Devices and Systems

FIG. 1 is a block diagram of a payment processing system 100 in accordance with some implementations. In accordance with some implementations, the payment processing system 100 includes client-side processing 102-1, 102-2 (hereinafter "client-side modules 102") executed on a mobile device 104-1, 104-2, server-side processing 106 (hereinafter "server-side module 106") executed on a server system 108 (sometimes also herein referred to as "the server"), and a payment module 124 coupled with an automatic retail machine 122. The client-side module 102 provides client-side functionalities for the payment processing system 100 and communications with both the server-side module 106 and the payment module 124. In some implementations, an application associated with the client-side module 102 provides a user interface to the payment processing system 100 for the mobile device 104. The client-side module 102 communicates with the server-side module 106 via a long-range communication protocol (e.g., GSM, CDMA, Wi-Fi, or the like) through one or more networks 110, and the client-side module 102 communicates with the payment module 124 via a short-range communication protocol (e.g., near-field communication (NFC), BLU- ETOOTH, BLUETOOTH low-energy (BLE), or the like). The server-side module 106 provides server-side functionalities for the payment processing system 100 for any number of client modules 102 each residing on a respective mobile device 104.

The payment processing system 100 harnesses the connectivity of the mobile device 104 to communicate with the payment module 124, which has neither a dedicated communication connection nor a long-range communication transceiver. As such, the mobile device 124 acts as a relay between the payment module 124 and the server system 108. Furthermore, leveraging the connectivity of the mobile device 104 helps to keep costs down from the point of view of the operator of the automatic retail machine 122.

In some implementations, the server-side module 106 includes one or more processors 112, a user information database 114, an offers database 116, and an input and output (I/O) interface to one or more clients 118. The I/O interface to one or more clients 118 facilitates the client-facing input and output processing for the server-side module 106. In some implementations, the one or more processors 112 authorize transaction requests, determine promotional offers for a particular mobile device 104, perform transaction accounting, and acknowledge completed transactions. The user information database 114 stores information for each user of the payment processing system 100 (e.g., user ID, account credentials (user name and password), transaction history, account balance, linked credit cards and bank accounts, and/or the like), and the offers database 116 stores promotional offers provided by manufacturers, distributors, retailers, and the like.

Examples of the mobile device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an eBook reader, or a combination of any two or more of these data processing devices or other data processing devices.

Examples of the one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

The server system 108 is implemented on one or more standalone data processing apparatuses or a distributed network of computers. In some implementations, the server system 108 also employs various virtual devices and/or services of third party service providers (e.g., third-party cloud service providers) to provide the underlying computing resources and/or infrastructure resources of the server system 108. In some implementations, the server system 108 includes, but is not limited to, a handheld computer, a tablet computer, a laptop computer, a desktop computer, or a combination of any two or more of these data processing devices or other data processing devices.

The payment processing system 100 shown in FIG. 1 includes both a client-side portion (e.g., the client-side module 102) and a server-side portion (e.g., the server-side module 106). In some implementations, data processing is implemented as a standalone application installed on the mobile device 104. In addition, the division of functionalities between the client and server portions of the payment processing system 100 can vary in different implementations. For example, in some implementations, the client-side module 102 is a thin-client that provides only user-facing input and output processing functions, and delegates all other data processing functionalities to a backend server (e.g., the server system 108). Although many aspects of the present technology are described from the perspective of the server system 108, the corresponding actions performed by the mobile device 104 would be apparent to ones skilled in the art without any creative efforts. Furthermore, some aspects of the present technology may be performed by the server system 108, the mobile device 104, or the server system 108 and the mobile device 104 cooperatively.

Figure 2:
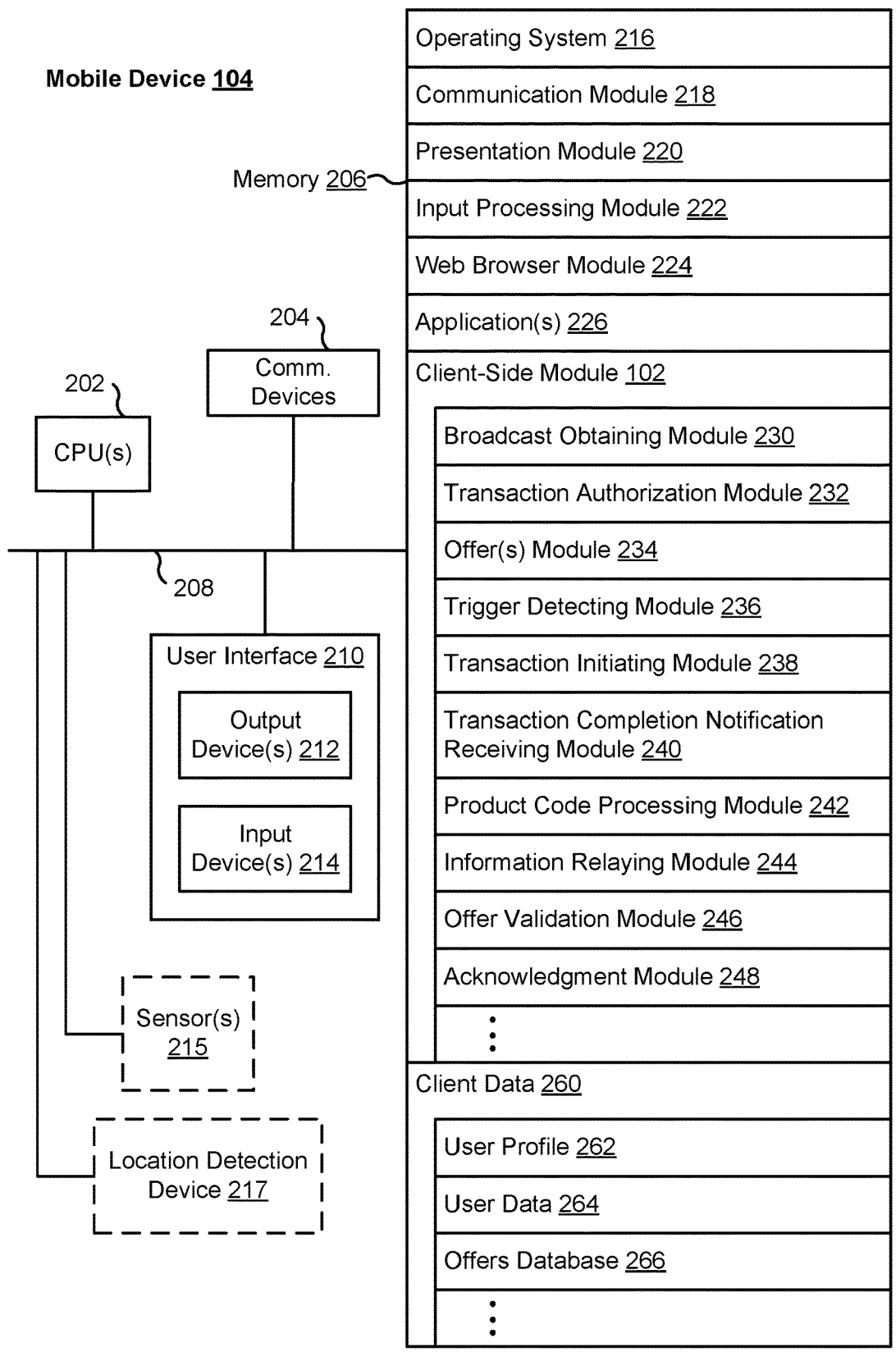
FIG. 2 is a block diagram of a mobile device in accordance with some implementations.

FIG. 2 is a block diagram of the mobile device 104 associated with a user in accordance with some implementations. The mobile device 104, typically, includes one or more processing units (CPUs) 202, two or more communication devices 204, memory 206, and one or more communication buses 208 for interconnecting these components (sometimes called a chipset). The two or more communication devices 204 include a first transceiver associated with a short-range communication protocol (e.g., NFC, BLE, or the like) and a second transceiver associated with a long-range communication protocol (e.g., GSM, CDMA, Wi-Fi, or the like). The mobile device 104 also includes a user interface 210. The user interface 210 includes one or more output devices 212 that enable presentation of media content (e.g., text, images, audio, video, etc.), including one or more speakers and/or one or more visual displays. The user interface 210 also includes one or more input devices 214, including user interface components that facilitate user input such as a keyboard, a mouse, a voice-command input unit or microphone, a touch screen display, a touch-sensitive input pad, a gesture capturing camera, or other input buttons or controls. Furthermore, in some implementations, the mobile device 104 uses a microphone and voice recognition or a camera and gesture recognition to supplement or replace the keyboard. In some implementations, the mobile device 104 optionally includes one or more sensors 215, which provide context information as to the current state of the mobile device 104 or the environmental conditions associated with mobile device 104. The one or more sensors 215 include, but are not limited, to one or more microphones, one or more cameras, an ambient light sensor, one or more accelerometers, one or more gyroscopes, a temperature sensor, one or more motion sensors, one or more biometric/biological sensors, and so on. In some implementations, the mobile device 104 optionally includes a location detection device 217, such as a GPS (global positioning satellite) or other geo-location receiver, for determining the location of the mobile device 104.

The memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 206, optionally, includes one or more storage devices remotely located from the one or more processing units 202. The memory 206, or alternatively the non-volatile memory within the memory 206, includes a non-transitory computer readable storage medium. In some implementations, the memory 206, or the non-transitory computer readable storage medium of the memory 206, stores the following programs, modules, and data structures, or a subset or superset thereof:

operating system 216 including procedures for handling various basic system services and for performing hardware dependent tasks;

communication module 218 for transmitting signals to and receiving signals from other devices (e.g., the server system 108 and the payment module 124) via the two or more communication devices 204;

presentation module 220 for enabling presentation of information (e.g., a user interface for the application(s) 226 or the application associated with client-side module 102, widgets, websites and web pages thereof, and/or games, audio and/or video content, text, etc.) at the mobile device 104 via one or more output devices 212 (e.g., displays, speakers, etc.) associated with the user interface 210;

input processing module 222 for detecting one or more user inputs or interactions from the one or more input devices 214 and interpreting the detected inputs or interactions;

web browser module 224 for navigating, requesting (e.g., via HTTP), and displaying websites and web pages thereof;

one or more applications 226 for execution by the mobile device 104 (e.g., games, application marketplaces, payment platforms, and/or other web or non-web based applications);

client-side module 102, which provides client-side data processing and functionalities for the payment processing system 100, including but not limited to:

broadcast obtaining module 230 for receiving, via the first transceiver, an information packet broadcast by a respective payment module 124, where the information packet at least includes a unique identifier corresponding to the respective payment module 124 (i.e., the device ID) and an authorization code for initiating a transaction with an automatic retail machine 122 to which the respective payment module 124 is coupled;

transaction authorization module 232 for: sending, via the second transceiver, a transaction authorization request to the server system 108 including the authorization code; receiving, via the second transceiver, an authorization grant token from the server system 108, including the authorization code, for initiating a transaction with the automatic retail machine 122 to which the respective payment module 124 is coupled; and storing the received authorization grant token (e.g., in the user data 264);

offer(s) module 234 for: obtaining (i.e., receiving or retrieving), via the second transceiver, promotional offers from the server system 108 (e.g., in response to sending the transaction authorization request, as part of an update to the application associated with the client-side module 102, or at another time); storing the promotional offers obtained from the server system in the offers database 266; optionally determining one or more promotional offers based on one or more of a plurality of factors (e.g., the device ID, user ID and history, current location of the mobile device 104, current time/date, and/or the like); presenting one or more promotional offers to the user of the mobile device via the one or more output devices 212 (e.g., a display); and detecting a user input selecting a respective one of the one or more promotional offers presented to the user of the mobile device 104;

trigger detecting module 236 for detecting a trigger to initiate a transaction with the automatic retail machine 122 to which the respective payment module 124 is coupled (e.g., the trigger is a gesture or other user input by the user of the mobile device 104, entrance of the mobile device 104 into a payment zone based on the RSSI observed from the payment module 124, selection of the respective promotional offer, or the like);

transaction initiating module 238 for initiating a transaction with the automatic retail machine 122 coupled with the respective payment module 124 by sending, via the first transceiver, the stored authorization grant token to the respective payment module 124;

transaction completion notification receiving module 240 for receiving, via the first transceiver, a transaction completion notification from the payment module 124, where the transaction completion notification includes one or more of: transaction status information (e.g., indicating whether the transaction with the automatic retail machine 122 was successful, aborted, or failed); transaction detail information (e.g., the authorization code, the amount of the transaction, the good/product associated with the transaction, the time/date the transaction was completed, transaction error information, and/or the like); and optionally includes other miscellaneous information regarding the respective payment module 124 and/or the automatic retail machine 122 to which the respective payment module 124 is coupled, such as interrupted transaction information, status flags, inventory information, past hard currency transaction information, other cashless transaction information, and/or the like;

product code processing module 242 for: providing a prompt to the user of the mobile device 104 via the one or more output devices 212 to obtain a product code for a vended product to validate the respective promotional offer; obtaining the product code for the vended product (e.g., the user of the mobile device 104 manually inputs the product code, the user of the mobile device 104 captures an image of the vended product from which the product code is extracted, the user of the mobile device 104 uses a scanner plug-in of the application associated with the client-side module 102 to obtain the product code, or the like); and either validating the product code or sending, via the second transceiver, the obtained product code to the server system 108 for validation;

information relaying module 244 for transmitting, via the second transceiver, information from the payment module 124 to the server system 108 (e.g., the transaction status information, the transaction detail information, the other miscellaneous information regarding the respective payment module 124 and/or the automatic retail machine 122 to which the respective payment module 124 is coupled, and/or the like);

offer validation module 246 for: receiving, via the second transceiver, promotion validation information from the server system 108; and presenting the promotion validation information to the user of the mobile device via the one or more output devices 212 (e.g., the display); and acknowledgment module 248 for sending, via the first transceiver, acknowledgment information to the payment module 124, where the acknowledgment information acknowledges that the server system 108 received and processed the transaction status information and the transaction detail information; and client data 260 storing data associated with the payment processing system 100, including, but is not limited to:

user profile 262 storing information for the user of the mobile device 104, including but not limited to: a unique user identifier (i.e., a user ID), login credentials (i.e., user name or handle and password), transaction history, payment data (e.g., account balance, linked credit card or bank information, app credit or gift card balance, billing address, shipping address, etc.), contact information (e.g., email address, phone number, etc.), custom parameters for the user (e.g., age, location, hobbies, etc.), identified trends and/or likes/dislikes of the user, and/or the like;

user data 264 storing transaction history information, authorization grant tokens, and/or the like; and offers database 266 storing promotional offers provided by manufacturers, distributors, retailers, and/or the like.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, the memory 206, optionally, stores a subset of the modules and data structures identified above. Furthermore, the memory 206, optionally, stores additional modules and data structures not described above.

Figure 3:
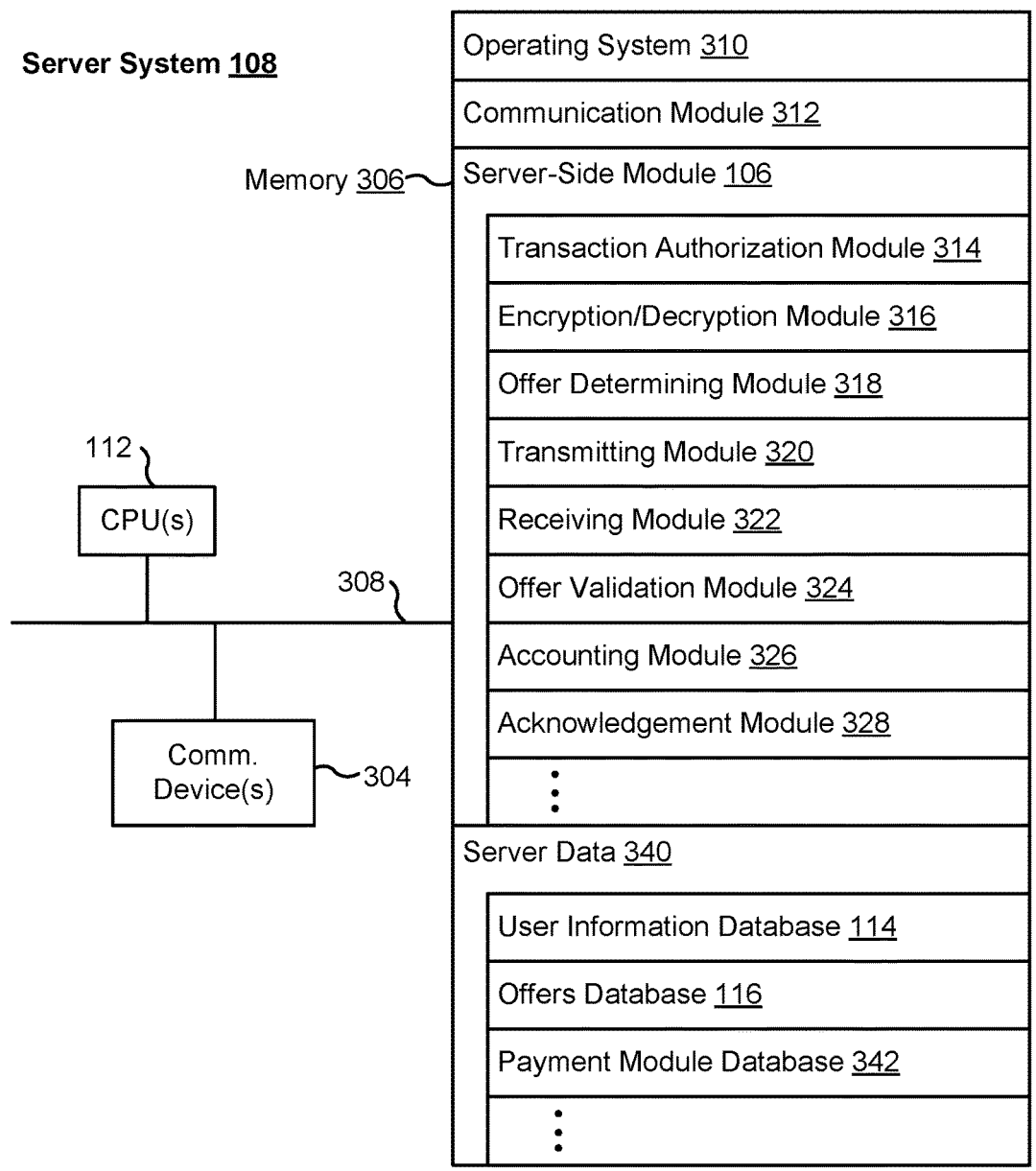
FIG. 3 is a block diagram of a server system in accordance with some implementations.

FIG. 3 is a block diagram illustrating the server system 108 in accordance with some implementations. The server system 108, typically, includes one or more processing units (CPUs) 112, one or more communication devices 304 (e.g., including the I/O interface to one or more clients 118), memory 306, and one or more communication buses 308 for interconnecting these components (sometimes called a chipset). The memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 306, optionally, includes one or more storage devices remotely located from the one or more processing units 112. The memory 306, or alternatively the non-volatile memory within the memory 306, includes a non-transitory computer readable storage medium. In some implementations, the memory 306, or the non-transitory computer readable storage medium of the memory 306, stores the following programs, modules, and data structures, or a subset or superset thereof:

operating system 310 including procedures for handling various basic system services and for performing hardware dependent tasks;

network communication module 312 for transmitting signals to and receiving signals from mobile devices 104 via the one or more communication devices 304;

server-side module 106, which provides server-side data processing and functionalities for the payment processing system 100, including but not limited to:

transaction authorization module 314 for: receiving a transaction request from a respective mobile device 104, where the transaction request includes a device ID associated with a respective payment module 124 and an authorization code; and validating the transaction request;

encryption/decryption module 316 for: identifying an encryption/decryption key linked to the device ID for the respective payment module 124; decrypting the authorization code with the identified encryption/decryption key; and encrypting the authorization grant token with the identified encryption/decryption key;

offer determining module 318 for determining one or more promotional offers based on one or more of a plurality of factors (e.g., the device ID included in the transaction request, the user ID and history associated with the user of the respective mobile device 104, current location of the respective mobile device 104, current time/date, and/or the like);

transmitting module 320 for: transmitting, in accordance with a determination that the transaction request is validated, an authorization grant token and the one or more promotional offers to the respective mobile device 104; and transmitting acknowledgment information once a transaction is completed to the respective mobile device 104;

receiving module 322 for receiving information from the respective mobile device 104, including but not limited to: a product code and a corresponding selected promotional offer, the transaction status information for a respective transaction, the transaction detail information for the respective transaction, and/or the other miscellaneous information;

offer validation module 324 for: validating a promotional offer based on a received product code, transaction status information, and/or transaction detail information; and sending, in accordance with a determination that the promotional offer is validated, promotion validation information to the respective mobile device 104;

accounting module 326 for debiting an account balance or charging a linked credit card or bank account according to the transaction detail information; and acknowledgment module 328 for sending acknowledgment information to the respective mobile device 104 for relay to the respective payment module 124;

server data 340 storing data for the payment processing system 100, including but not limited to:

user information database 114 storing stores information for each user of the payment processing system 100, including but not limited to: a unique user identifier (i.e., a user ID), login credentials (i.e., user name or handle and password), transaction history, payment data (e.g., account balance, linked credit card or bank information, app credit or gift card balance, billing address, shipping address, etc.), contact information (e.g., email address, phone number, etc.), custom parameters for the user (e.g., age, location, hobbies, etc.), identified trends and/or likes/dislikes of the user, and/or the like;

offers database 116 storing promotional offers provided by manufacturers, distributors, retailers, and/or the like; and payment module database 342 storing information for each payment module 124 of the payment processing system 100, including but not limited to: a unique payment module identifier (i.e., a device ID), an encryption/decryption key, and/or the like.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 306, optionally, stores a subset of the modules and data structures identified above. Furthermore, the memory 306, optionally, stores additional modules and data structures not described above.

In some implementations, at least some of the functions of the server system 108 are performed by the mobile device 104, and the corresponding sub-modules of these functions may be located within the mobile device 104 rather than the server system 108. In some implementations, at least some of the functions of mobile device 104 are performed by the server system 108, and the corresponding sub-modules of these functions may be located within the server system 108 rather than the mobile device 104. The mobile device 104 and the server system 108 shown in FIGS. 2-3, respectively, are merely illustrative, and different configurations of the modules for implementing the functions described herein are possible in various implementations.

Figure 4:
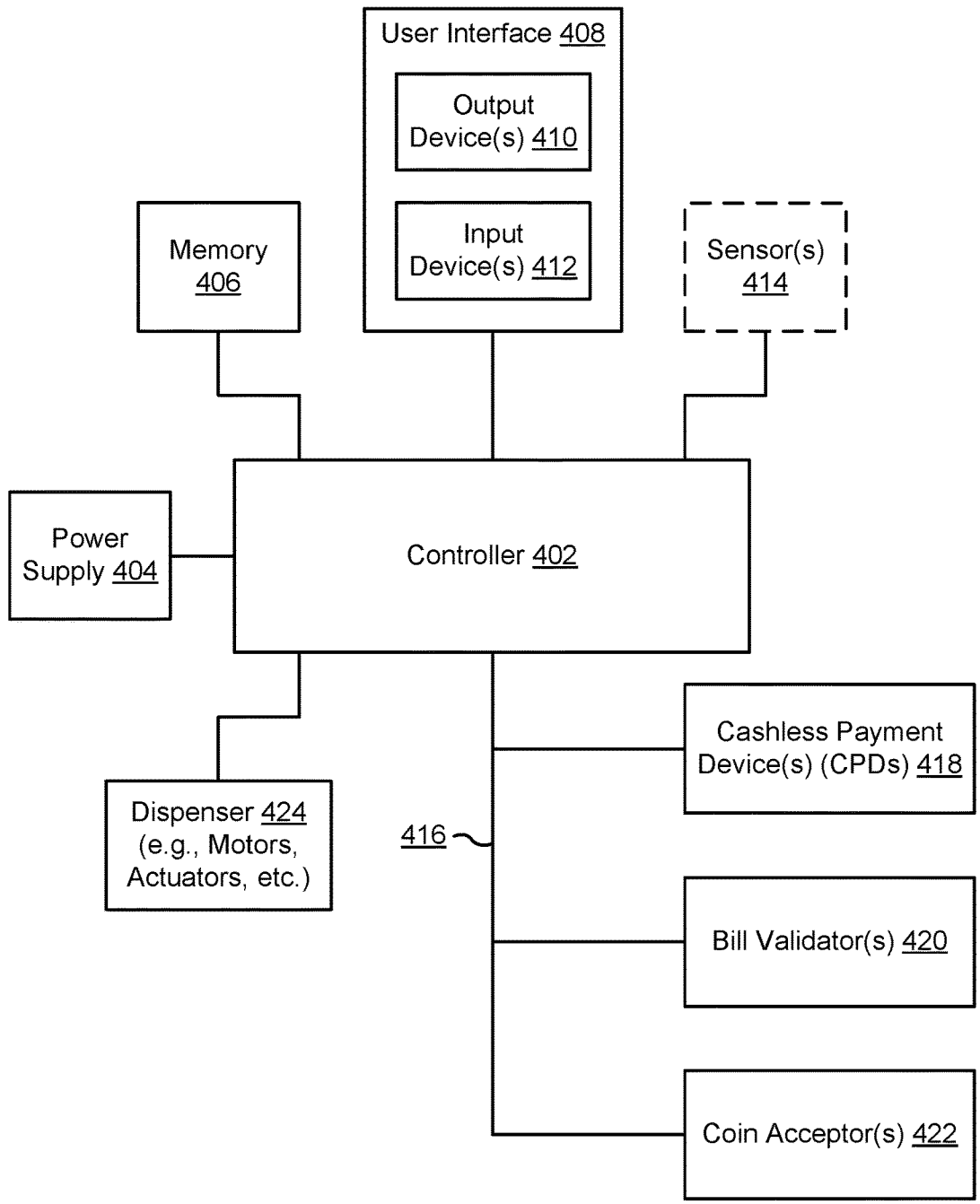
FIG. 4 is a schematic block diagram of an automatic retail machine in accordance with some implementations.

FIG. 4 is a schematic block diagram illustrating the automatic retail machine 122 in accordance with some implementations. For example, the automatic retail machine 122 is a vending machine or kiosk that dispenses an item or product (e.g., snacks, other foodstuffs, school supplies, drinks, tickets, and the like) in response to user payment for and selection of the item or product. The automatic retail machine 122 includes: a controller 402; a power supply 404; memory 406; a user interface 408; one or more optional sensors 414; a multi-drop bus (MDB) 416; and a dispenser 424.

In some implementations, the controller 402 is a microcontroller, microprocessor, CPU, FPGA, ASIC, or the like that manages the functions of the automatic retail machine 122. The power supply 404 is a connection to an external power source (e.g., AC or DC) or a connection to an internal power source (e.g., a battery). In some implementations, the power supply 404 further includes one or more of a power converter and/or inverter, a rectifier, a power conditioner, or the like for providing power to the various components of the automatic retail machine 122. The memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. In some implementations, the memory 406 stores an operating system and instructions for carrying out the functions and processes of the automatic retail machine 122 (e.g., dispensing items, tracking inventory, temperature control, power control, and the like). In some implementations, the memory 406 also stores configuration data and DEX (data exchange) data corresponding to the inventory of the automatic retail machine 122 and transactions performed with the automatic retail machine 122.

The user interface 408 includes one or more output devices 410 that enable presentation of information (e.g., text, images, audio, video, etc.), for example, one or more speakers and/or one or more visual displays. The user interface 408 also includes one or more input devices 412, including user interface components that facilitate user input and selection of items such as a microphone, a keypad, a touch screen display, a gesture capturing camera, or other input buttons or controls. The one or more optional sensors 414 include, but are not limited, to one or more microphones, one or more cameras, an ambient light sensor, one or more accelerometers, one or more gyroscopes, a temperature sensor, one or more motion sensors, one or more biometric/biological sensors, and so on.

In some implementations, a variety of payment devices are coupled with the MDB 416 including any combination of one or more cashless payment devices 418 (e.g., credit card reader(s)) for accepting cashless payments, one or more bill validators 420 for accepting and validating bills, and one or more coin accepters 422 for accepting coins and providing change. In some implementations, the dispenser 424 is an electromechanical system (e.g., motors, actuators, and the like) for dispensing or vending items or products stocked by the automatic retail machine. 122 For example, a user inserts a bill into the bill validator(s) 420 and is credited with an amount of money equal to the bill. Continuing with this example, the one or more output devices 410 (e.g., a display) shows the credited amount, and the user selects an item via the one or more input devices 412 (e.g., using a keypad or a sequence of button presses). Subsequently, the controller 402 sends signals to the dispenser 424 to dispense the selected product, and the dispenser dispenses or vends the selected product.

Figure 5:
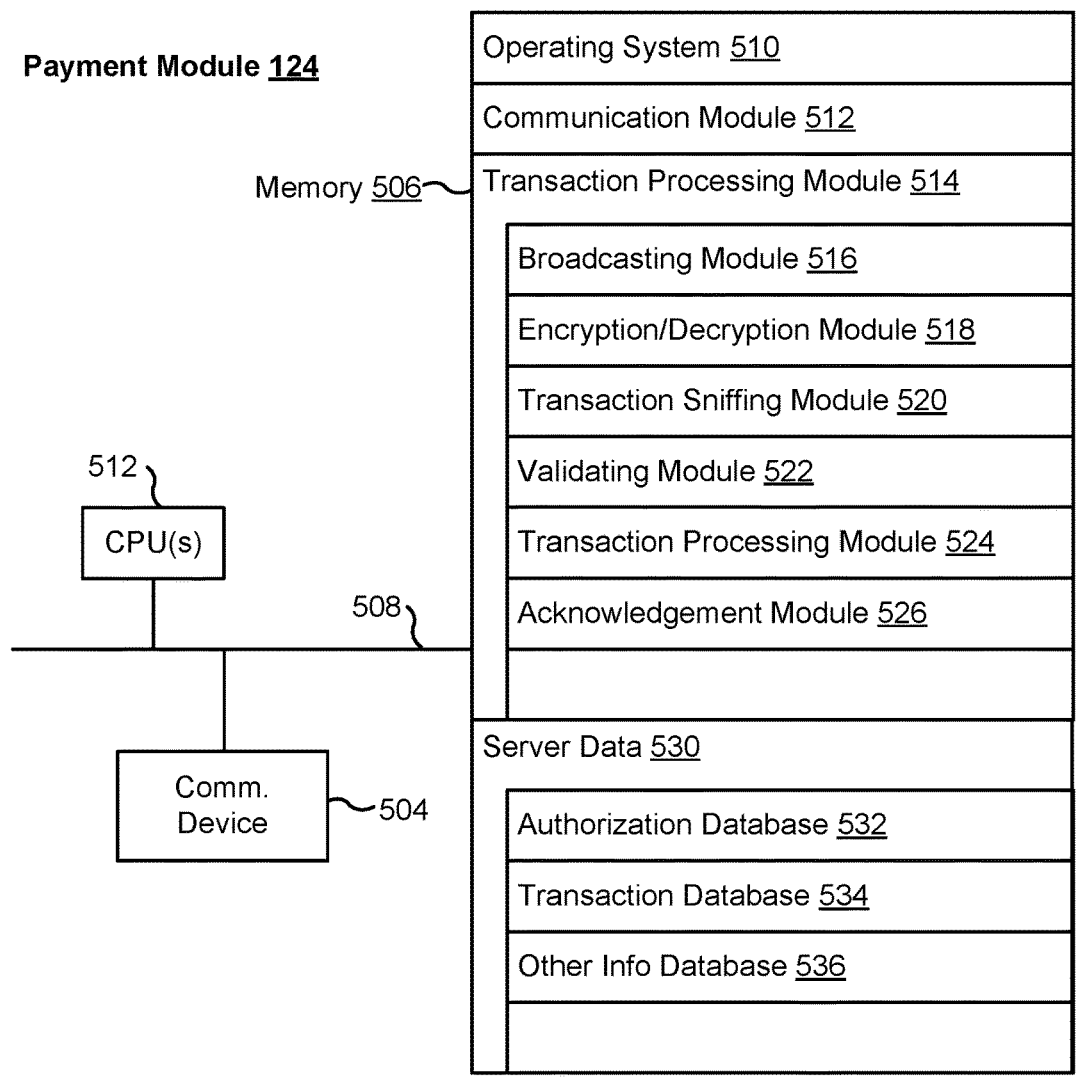
FIG. 5 is a block diagram of a payment module in accordance with some implementations.

FIG. 5 is a block diagram illustrating the payment module 124 in accordance with some implementations. In some implementations, the payment module 124 is an in-line adapter dongle with male and female connectors that couples with the multi-drop bus (MDB) of the respective automatic retail machine 122 as shown in FIGS. 6B-6C and 7. For example, the payment module is connected in-line into the MDB 416 in FIG. 4. The payment module 124, typically, includes one or more processing units (CPUs) 512, a communication device 504 (e.g., a transceiver associated with a short-range communication protocol such as NFC, BLE, or the like), memory 506, and one or more communication buses 508 for interconnecting these components (sometimes called a chipset). The memory 506 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 506, optionally, includes one or more storage devices remotely located from one or more processing units 512. The memory 506, or alternatively the non-volatile memory within the memory 506, includes a non-transitory computer readable storage medium. In some implementations, the memory 506, or the non-transitory computer readable storage medium of the memory 506, stores the following programs, modules, and data structures, or a subset or superset thereof:

- operating system 510 including procedures for handling various basic system services and for performing hardware dependent tasks;

- communication module 512 for transmitting signals to and receiving signals from mobile devices 104 via the communication device 504;
- transaction-processing module 514, including but not limited to:
  - broadcasting module 516 for: broadcasting an information packet to zero or more client devices 104 within the communication zone of the payment module 124 (i.e., BLE range), where the information packet at least includes a unique identifier corresponding to the payment module 124 (e.g., the device ID) and an authorization code for initiating a transaction with the automatic retail machine 122 to which the payment module 124 is coupled; and storing broadcast authorization codes in authorization database 532;
  - encryption/decryption module 518 for: encrypting the authorization code with an encryption/decryption key that corresponds to the payment module 124; and decrypting the authorization grant token with the encryption/decryption key;
  - transaction sniffing module 520 for: detecting signals associated with hard currency transactions and/or other cashless transactions not associated with the payment processing system 100 (e.g., credit card transactions); and storing information associated with said hard currency transactions and/or other cashless transactions (e.g., in the other information database 536);
  - validating module 522 for validating a transaction by checking the authorization code from the decrypted authorization grant token against previously broadcast authorization codes stored in the authorization database 532;
  - transaction processing module 524 for: causing, in accordance with a determination that the transaction is validated, the automatic retail machine 122 to vend a product or perform a service; and storing transaction detail information in the transaction database 534; and
  - acknowledgement module 526 for deleting transaction detail information from the transaction database 534 in accordance with a determination that the corresponding transaction is acknowledged by the server system 108; and
- data 530 storing data, including but not limited to:
  - authorization database 532 storing previously broadcast authorization codes;
  - transaction database 534 storing transaction detail information for transactions processed by the payment module 124; and
  - other information database 536 storing miscellaneous information regarding the payment module 124 and/or the automatic retail machine 122 coupled with the payment module 124 such as status flags, inventory information, past hard currency transaction information, other cashless transaction information, and/or the like.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 506, optionally, stores a subset of the modules and data structures identified above. Furthermore, the memory 506, optionally, stores additional modules and data structures not described above.

Figure 6A:
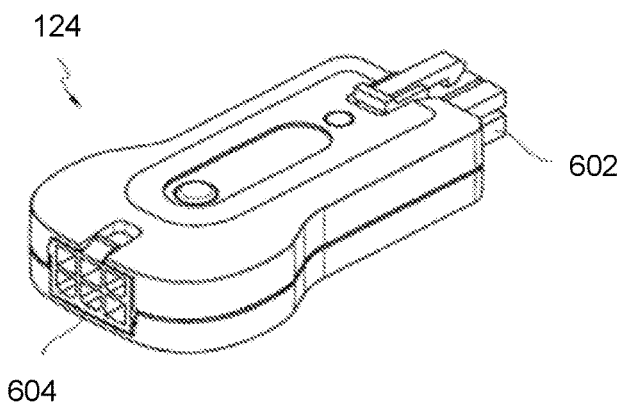
FIG. 6A is a perspective view of the payment module of FIG. 5 (e.g., an in-line dongle adapter) in accordance with some implementations.
Figure 6B:
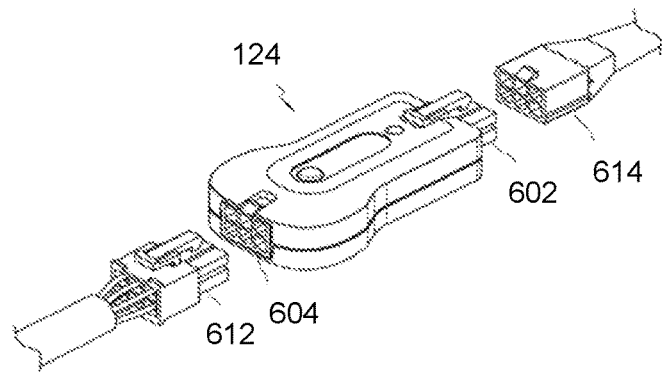
FIG. 6B is a perspective view taken from the first end of the payment module of FIG. 6A in accordance with some implementations.
Figure 6C:
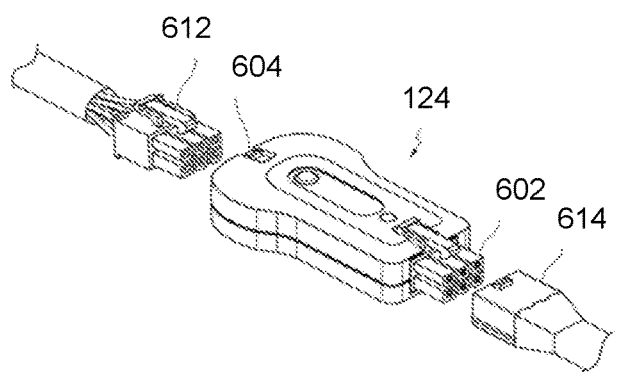
FIG. 6C is a perspective view taken from the second end of the payment module of FIG. 6A in accordance with some implementations.

FIGS. 6A-6C show various views of the payment module 124 of FIG. 5 in accordance with some implementations. The payment module 124 is a relatively low cost hardware component that is pre-configured to work with the industry standard multi-drop bus (MDB). On machines without MDB technology, the payment module 124 can be configured or designed to work with other serial protocols or activate a switch (e.g., a cherry switch mechanism). For example, see U.S. patent application Ser. No. 14/458,192, entitled "Method and System for Retrofitting an Offline-Payment Operated Machine to Accept Electronic Payments," which is incorporated by reference in its entirety. In essence, the payment module 124 simulates establishing payment on the automatic retail machine 122 in much the same manner as other alternative forms of payment (e.g., cash).

The payment module 124 is preferably designed to be used as an adapter dongle for in-line insertion within, for example, the MDB of the automatic retail machine 122 (e.g., a vending machine). The wire used in MDB technology uses male and female connection ends or adapters to allow the attachment of peripherals. In the case of a vending machine, the MDB with connection ends or adapters would be present to allow the attachment of a payment receiving mechanism (e.g., a coin mechanism). The MDB male and female adapters 612, 614 of the MDB may be separated (as shown in FIGS. 6B-6C). The payment module 124 in FIGS. 6A-6C has a male adapter 602 and a female adapter 604. The payment module 124 may be plugged (inserted) in serial ("in-line") with the MDB. For example, the MDB female adapter 614 may be connected to the male adapter 602 of the payment module 124, and the MDB male adapter 612 may be connected to the female adapter 604 of the payment module 124. The resulting in-line configuration is shown in FIG. 7. It should be noted that the payment module 124 is designed to allow pass-through communications so that if the mobile-device-to-machine payment processing system is not enabled (e.g., for a particular purchase or simply turned off) the MDB functions as though the payment module 124 is not there and the automatic retail machine 122 can function normally. In FIG. 7, the automatic retail machine 122 includes a display 722 showing user selections, current credit, and the like. In FIG. 7, the automatic retail machine 122 also includes a touch-screen display 724 and buttons 726 for selecting a product.

User Interfaces and Related Processes

FIG. 8 is a schematic flow diagram of a process 800 for authenticating a user to perform a transaction in the payment processing system 100 in accordance with some implementations. In some implementations, the payment processing system 100 includes one or more payment modules 124 (e.g., each associated with a respective automatic retail machine 122 such a vending machine for dispensing goods and/or services), one or more mobile devices 104, and the server 108. Each of the one or more mobile devices 104 executes an instance of the client-side module 102 (e.g., as an application) as a foreground or background process to access and communicate with other devices (e.g., the server 108 and the payment modules 124) in the payment processing system 100. The server 108 manages the payment processing system 100 and, in some cases, is associated with an entity that supplies, operates, and/or manufactures the one or more payment modules 124. For brevity, the process 800 will be described with respect to a respective payment module 124 and a respective mobile device 104 within the payment processing system 100.

The payment module 124 broadcasts (802), via a short-range communication capability (e.g., BLE), an information packet. The information packet at least includes an authorization code and a unique identifier associated with the payment module 124 (i.e., the device ID). In some implementations, the information packet further includes a current firmware version of the payment module 124 and one or more status flags corresponding to one or more states of the payment module 124 and/or the automatic retail machine 122. The information packet is further discussed below with reference to FIG. 10A.

In some implementations, the payment module 124 sends out a unique authorization code every X seconds (e.g., 100 ms, 200 ms, 500 ms, etc.). In some implementations, the unique authorization codes are randomly or pseudo-randomly generated numbers. In some implementations, the payment module 124 initializes a random number and then the authorization codes are sequential counts from this random number. In such implementations, the payment module 124 stores the earliest valid (unexpired) counter without a need to store every valid authorization code. In some implementations, the authentication code included in the broadcast information packet is a hash value of the randomly or pseudo-randomly generated number or the sequential number.

In some implementations, the payment module 124 stores broadcast authorization codes (e.g., in authorization database 542, FIG. 5) until a received authorization grant token matches one of the stored authorization codes and subsequently deletes the matching authorization code. In some implementations, the broadcast authorization codes are one-time use codes whereby a broadcast authorization code may only be used by one mobile device 104 before it is invalidated and/or deleted to prevent re-play attacks. In some implementations, the payment module 124 stores previously broadcast authorization codes for a predetermined amount of time (e.g., Y minutes) after which time an authorization code expires and is deleted. In some implementations, the authorization code is encrypted with a shared secret key known by the server system 108 but unique to the payment module 124.

The mobile device 104 receives the broadcast information packet, and the mobile device 104 sends (804), via a long-range communication capability (e.g., GSM, CDMA, Wi-Fi, or the like), an authorization request to the server system 108. For example, an application associated with the client-side module 102 is executed as a foreground or background process on the mobile device 104. The application is used for accessing the payment processing system 100. In this example, the application receives the broadcast information packet when the mobile device 104 is within the communication zone of the payment module 124 (i.e., BLE range) and either automatically sends the authorization request to the server system 108 or sends the authorization request to the server system 108 when the mobile device 104 is within the authorization zone of the payment module 124.

In some implementations, the broadcast information packet includes a baseline authorization zone threshold (i.e., an authorization zone criterion) indicating a baseline received signal strength indication (RSSI) that the mobile device 104 (or the application associated with the client-side module 102) is required to observe from the payment module 124 before being within the authorization zone of the payment module 124. In some implementations, the mobile device 104 (or the application associated with the client-side module 102) offsets the baseline authorization zone threshold based on the reception strength its short-range communication capability (e.g., BLE radio/transceiver) and/or other similar factors. In some implementations, the authorization request at least includes the authorization code which was included in the broadcast information packet, an identifier associated with the user of the mobile device 104 or the user account under which the user of the mobile device 104 is logged into the application (i.e., user ID), and the identifier associated with the payment module 124 (i.e., device ID). In some implementations, the authentication code included in the authorization request is a hash value in cleartext. The authorization request is further discussed below with reference to FIG. 10B.

After receiving the authorization request, the server system 108 processes (806) the authorization request. In some implementations, the server system 108 identifies a shared secret key based on the device ID and decrypts the authorization code included in the authorization request with the identified shared secret key. The server system 108 determines whether the user associated with the user ID in the authorization request has sufficient funds in his/her account for the payment processing system to perform a transaction at the automatic retail machine 122 to which the payment module 124 corresponding to the device ID is coupled.

The server system 108 sends (808), via a long-range communication capability (e.g., GSM, CDMA, Wi-Fi, or the like), an authorization grant token to the mobile device 104. In some implementations, the server system 108 does not send the authorization grant token if the authorization code in the authorization request cannot be decrypted with the shared secret key corresponding to the payment module 124 (e.g., the authorization code is corrupted or hacked). In some implementations, the server system 108 does not send the authorization grant token if the user associated with the user ID in the authorization request does not have sufficient funds in his/her account or has exceeded a predefined daily limit. In some implementations, in addition to the authorization grant token (or lack thereof if the authorization is declined), the server system 108 sends a message directly to the mobile device 104 which is not encrypted with the shared secret key corresponding to the payment module 124. After receiving the message, the mobile device 104 displays an appropriate message to the user such as sufficient funds, transaction authorized, insufficient balance, or declined authorization. In some implementations, the server system 108 sends an authorization grant token for an amount equal to zero; in which case, the payment module 124 interprets this as a declined or failed authorization which can result for any number of reasons including, but not limited to, insufficient balance or credit. In some implementations, the mobile device 104 stores the authorization grant token (e.g., in the user data 264) until a trigger condition is detected.

The mobile device 104 receives the authorization grant token, and, subsequently, the mobile device 104 detects (810) a trigger condition. In some implementations, the mobile device 104 (or the application) detects the trigger condition via the hand-free mode (e.g., upon entrance into the payment zone of the payment module 124) or manual mode (e.g., interacting with the user interface of the application to initiate a transaction with the payment accepting unit associated with the payment module 124).

In some implementations, the trigger condition is satisfied when the mobile device 104 detects a user input on the user interface displayed by the mobile device 104. For example, with reference to FIG. 11A, a transaction is initiated between the user of the mobile device 104 and the 8th floor snack machine when the mobile device 104 detects an upward swipe gesture originating from region 1120 of the user interface 1108. In another example, with reference to FIG. 11D, a transaction is initiated between the user of the mobile device 104 and the 8th floor snack machine when the mobile device 104 detects selection of Offer A 1152 with contact 1166.

In some implementations, the trigger condition is satisfied when the mobile device 104 observes an RSSI from a respective automatic retail machine that is greater than or equal to the payment zone criterion. For example, once the mobile device 104 is within the payment zone, a transaction between the respective automatic retail machine and the user of the mobile device 104 is automatically initiated. In some implementations, after the RSSI observed from the respective retail machine is greater than or equal to the payment zone criterion, the mobile device 104 prompts the user to provide a transaction confirmation, which when detected serves to satisfy the trigger condition. For example, once the mobile device 104 is within the payment zone, the mobile device 104 provides a prompts to the user, such as an audible prompt, displayed notification, or vibration, to confirm his/her intention to initiate a transaction with the respective retail machine. Continuing with this example, the user may confirm his/her intention to initiate the transaction with the respective retail machine by flicking the mobile device 104 towards the automatic retail machine, shaking the mobile device, providing an audible command, or performing a touch input/gesture on the displayed user interface.

In some implementations, unused authorization grants (e.g., if there was no trigger condition or it expired) are canceled by the mobile device 104 by sending a cancellation message to the server system 108 corresponding to the unused authorization grant. In some implementations, the server system 108 denies or limits the number of authorization grants sent to the mobile device 104 until it has received transaction information or cancellation of authorization outstanding authorization grants sent to the mobile device 104.

In response to detecting the trigger condition, the mobile device 104 sends (812), via the short-range communication capability (e.g., BLE), the authorization grant token to the payment module 124. Subsequently, the automatic retail machine 122 displays credit to the user (e.g., via one of the displays 722 or 724 shown in FIG. 7) and the user interacts with the input mechanisms of the automatic retail machine 122 (e.g., via the buttons 726 or a touch screen display 724 shown in FIG. 7) to purchase products and/or services.

It should be understood that the particular order in which the process in FIG. 8 has been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., the process 900 and the method 1200) are also applicable in an analogous manner to the process 800 described above with respect to FIG. 8.

FIG. 9 is a schematic flow diagram of a process 900 for processing acknowledgment information in the payment processing system 100 in accordance with some implementations. In some implementations, the payment processing system 100 includes one or more payment modules 124 (e.g., each associated with a respective automatic retail machine 122 such a vending machine for dispensing goods and/or services), one or more mobile devices 104, and the server 108. Each of the one or more mobile devices 104 executes an instance of the client-side module 102 (e.g., as an application) as a foreground or background process to access and communicate with other devices (e.g., the server 108 and the payment modules 124) in the payment processing system 100. The server 108 manages the payment processing system 100 and, in some cases, is associated with an entity that supplies, operates, and/or manufactures the one or more payment modules 124. For brevity, the process 900 will be described with respect to a respective payment module 124 coupled with a respective automatic retail machine 122 and a respective mobile device 104 in the payment processing system 100. In the process 900, the payment module 124 receives first acknowledgment information for a first transaction via the mobile device 104 that initiated the first transaction.

The payment module 124 obtains (902) a first notification indicating completion of a first transaction from the automatic retail machine 122. For example, after the process 800 in FIG. 8, the user of the mobile device 104 selects a product to purchase from the automatic retail machine 122 by interacting with one or more input mechanisms of the automatic retail machine 122 (e.g., the buttons 726 or a touch screen display 724 shown in FIG. 7), and the automatic retail machine 122 dispenses the selected product. Continuing with this example, after the product is dispensed, the transaction is complete and the payment module 124 obtains a notification from the machine of the completed transaction. In some implementations, the notification includes the amount of the transaction and (optionally) machine status information associated with the automatic retail machine 122 such as inventory information as to one or more products of the automatic retail machine 122 and/or the like.

After obtaining the first notification, the payment module 124 generates (904) first transaction information based on the first notification, and the payment module 124 stores the first transaction information. In some implementations, the transaction information includes a transaction ID for the first transaction, a device ID corresponding to the payment module 124, a user ID corresponding to the mobile device 104, transaction status information indicating that the first transaction is complete, and the transaction amount indicated by the first notification. In some implementations, the payment module 124 retains the authorization code included in the original broadcasted packet and/or the authorization grant token and includes the authorization code in the first transaction information. In some implementations, the authorization code is encrypted with a secret key corresponding to the payment module 124, which is shared with the server system 108 but not the mobile device 104. In some implementations, the first transaction information further includes other information such as the machine status information included in the first notification or transaction information corresponding to previous interrupted transaction(s). See FIG. 10D and the accompanying text for further discussion regarding the transaction information 1050.

The payment module 124 sends (906), via a short-range communication capability (e.g., BLE), the first transaction information to the mobile device 104.

The mobile device 104 sends (908), via a long-range communication capability (e.g., GSM, CDMA, Wi-Fi, or the like), the first transaction information to the server system 108.

The server system 108 processes (910) the first transaction information. For example, the server system 108 debits the account of the user associated with the user ID in the first transaction information in the amount indicated by the first transaction information.

The server system 108 sends (912), via a long-range communication capability (e.g., GSM, CDMA, Wi-Fi, or the like), first acknowledgment information to the mobile device 104. In some implementations, the first acknowledgment information acknowledges that the server system 108 received the first transaction information. In some implementations, the first acknowledgment information includes the user ID, the device ID, the transaction ID, and (optionally) the authorization grant included in the transaction information (e.g., the authorization code 1058, FIG. 10D).

After receiving the first acknowledgement information, the mobile device 104 sends (914), via a short-range communication capability (e.g., BLE), the first acknowledgment information to the payment module 124.

After receiving the first acknowledgment information, the payment module 124 deletes (916) the stored first transaction information.

It should be understood that the particular order in which the process in FIG. 9 has been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., the process 800 and the method 1200) are also applicable in an analogous manner to the process 900 described above with respect to FIG. 9.

Figure 10A:
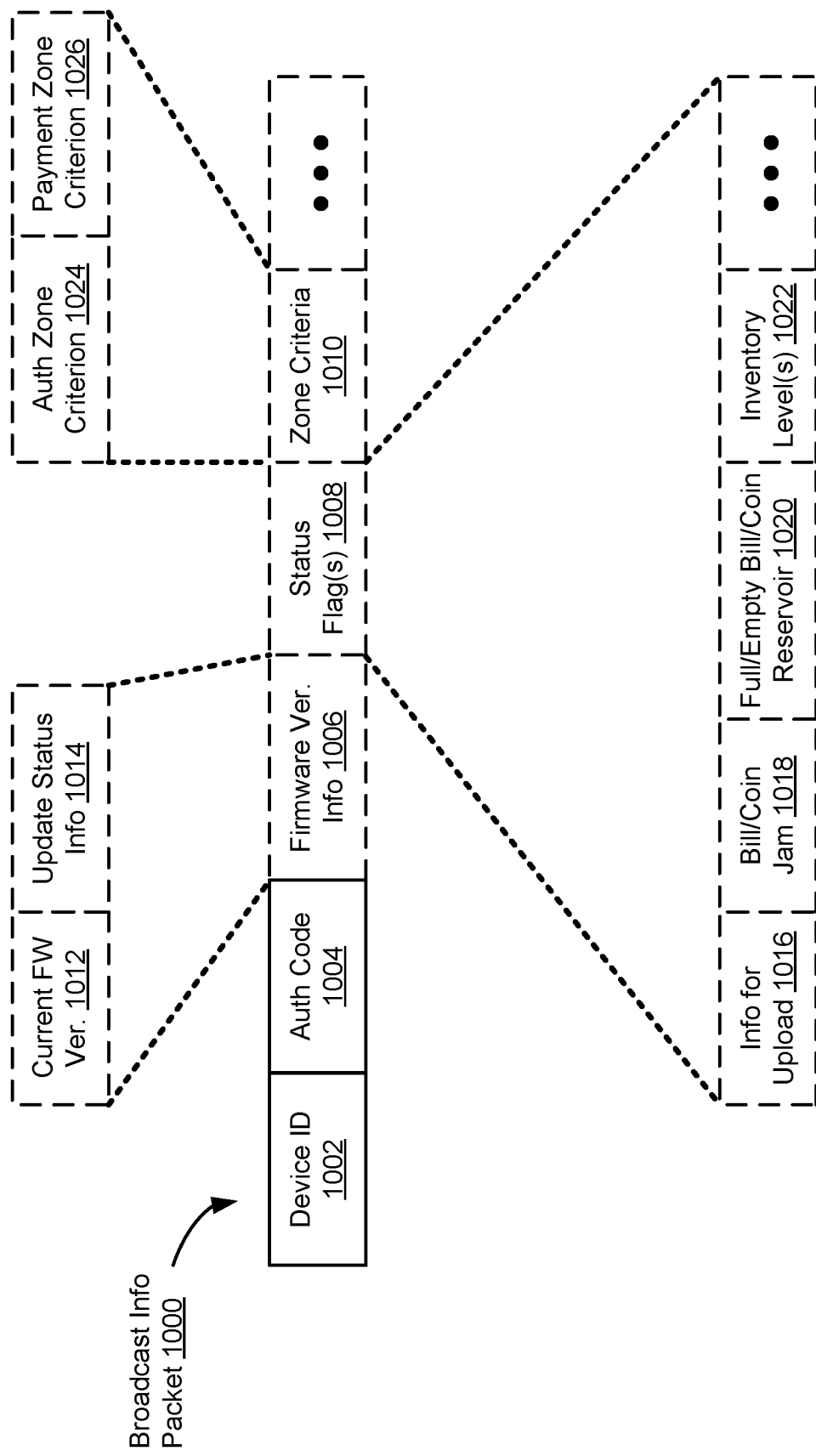
FIG. 10A is a block diagram of an information packet broadcast by the payment module in accordance with some implementations.

FIG. 10A is a block diagram of an information packet 1000 broadcast by the payment module 124 (e.g., in step 802 of the process 800 in FIG. 8) in accordance with some implementations. In some implementations, the information packet 1000 at least includes: device ID 1002 and authorization code 1004. In some implementations, the information packet 1000 additionally includes: a current firmware version 1006; one or more status flags 1008; and zone criteria information 1010.

In some implementations, the device ID 1002 is a unique identifier corresponding to the payment module 124 that broadcast the information packet 1000.

In some implementations, the authorization code 1004 is a hash value in cleartext. In some implementations, the payment module 124 randomly or pseudo-randomly generates a number or determines a sequential number (See step 802 of the process 800 in FIG. 8) and performs a predetermined hash function (e.g., SHA-256) on the number to produce the hash value as the authorization code 1004. In some implementations, the authorization code 1004 is a unique code that is encrypted with a secret encryption key corresponding to the payment module 124. The secret encryption key is shared with the server system 108, which enables the server system 108 to decrypt the authorization code 1004 and encrypt the authorization grant token but not the mobile device 104. In some implementations, the encryption between server system 108 and payment module 124 is accomplished by two pairs of public/private keys.

In some implementations, the firmware version information 1006 identifies a current firmware version 1012 of the payment module 124. In some implementations, the firmware version information 1006 also includes update status information 1014 indicating one or more packets received by the payment module 124 to update the firmware or one or more packets needed by the payment module 124 to update the firmware.

In some implementations, the one or more status flags 1008 indicate a state of the payment module 124 and/or the automatic retail machine 122 to which the payment module 124 is coupled. In some implementations, the one or more status flags 1008 indicate a state of the payment module 124 such upload information indicator 1016 indicating that that the payment module 124 has information to be uploaded to the server system 108 (e.g., transaction information for one or more interrupted transactions). In some implementations, upload information indicator 1016 triggers the mobile device 104 to connect to payment module 124 immediately (e.g., if it has interrupted transaction information to be uploaded to the server system 108). In some implementations, the one or more status flags 1008 indicate a state of the automatic retail machine 122 including one or more of an error indicator 1018 (e.g., indicating that a bill and/or coin acceptor of the automatic retail machine 122 is experiencing a jam, error code, or malfunction), a currency level indicator 1020 (e.g., indicating that the level of the bill and/or coin acceptor reservoir of the automatic retail machine 122 is full or empty), and/or inventory level(s) indicator 1022 (e.g., indicating that one or more products of the automatic retail machine 122). In some implementations, the one or more status flags 1008 are error codes issued by the automatic retail machine 122 over the MDB.

In some implementations, the zone criteria information 1010 specifies an authorization zone criterion 1024 (e.g., a baseline authorization zone threshold indicating a baseline RSSI that the mobile device 104 (or the application) is required to observe before being within the authorization zone of the payment module 124) and/or a payment zone criterion 1026 (e.g., a baseline payment zone threshold indicating a baseline RSSI that the mobile device 104 (or the application) is required to observe before being within the payment zone of the payment module 124). In some implementations, the baseline authorization zone threshold and the baseline payment zone threshold are default values determined by the server system 108 or stored as variables by the application, in which case the authorization zone criterion 1024 and payment zone criterion 1026 are offsets to compensate for the strength and/or reception of the short-range communication capability (e.g., BLE radio/transceiver) of the payment module 124. Alternatively, zone criteria information 1010 includes a spread between the baseline authorization zone threshold and the baseline payment zone threshold. Thus, the mobile device 104 (or the application) determines the baseline authorization zone threshold and the baseline payment zone threshold based on the spread value and a default value for either the baseline authorization zone threshold or the baseline payment zone threshold. For example, the spread indicates −10 db and the default baseline payment zone threshold is −90 db; thus, the baseline authorization zone threshold is −80 db. Continuing with this example, after determining the baseline authorization zone threshold and the baseline payment zone threshold, the mobile device 104 (or the application) may further adjust the authorization zone threshold and/or the payment zone threshold based on the strength and/or reception of its short-range communication capability (i.e., BLE radio/transceiver).

Figure 10B:
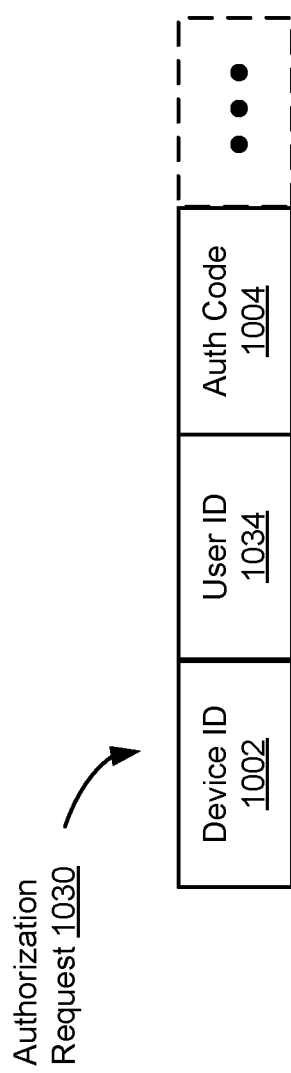
FIG. 10B is a block diagram of an authorization request in accordance with some implementations.

FIG. 10B is a block diagram of an authorization request 1030 sent by the mobile device 104 to the system server 108 (e.g., in step 804 of the process 800 in FIG. 8) in accordance with some implementations. In some implementations, the authorization request 1030 at least includes: a device ID 1002; a user ID 1034; and an authorization code 1004.

In some implementations, the device ID 1002 is a unique identifier corresponding to the payment module 124 that broadcast the information packet 1000 that included the authorization code 1004.

In some implementations, the user ID 1034 is a unique identifier associated with the user of the mobile device 104 sending the authorization request 1030 to the server system 108. In some implementations, the user ID 1034 is associated with the user account under which the user of the mobile device 104 is logged into the application.

In some implementations, the authorization code 1030 is the authorization code 1004 included in the information packet 1000 of that was broadcast by the payment module 124.

Figure 10C:
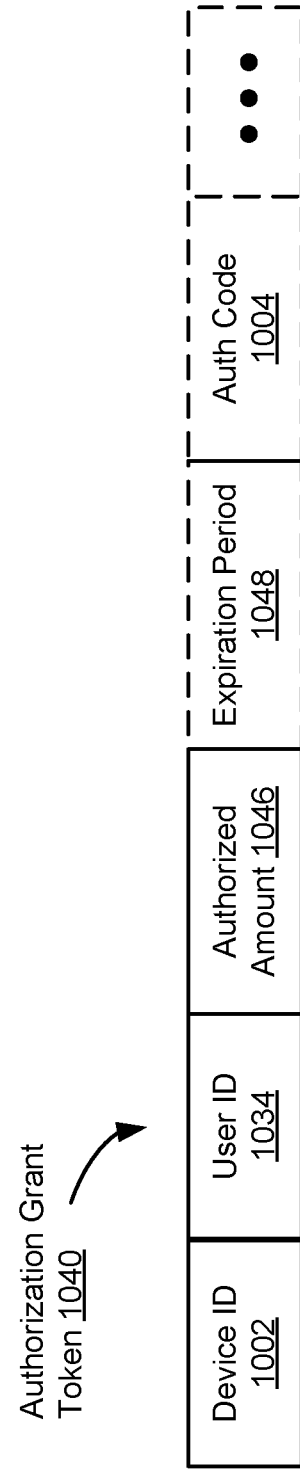
FIG. 10C is a block diagram of an authorization grant token in accordance with some implementations.

FIG. 10C is a block diagram of an authorization grant token 1040 sent by the server system 108 to the mobile device 104 (e.g., in step 808 of the process 800 in FIG. 8) in accordance with some implementations. In some implementations, in accordance with a determination that the authorization code 1036 included in the authorization request 1030 from the mobile device 104 is valid and that the user associated with the mobile device 104 has sufficient funds in his/her account for the payment processing system, the server system 108 generates the authorization grant token 1040. In some implementations, the authorization grant token 1040 at least includes: a device ID 1002; a user ID 1034; an authorized amount 1046; (optionally) an expiration period 1048; and (optionally) the authorization code 1004. In some implementations, the authorization grant token 1040 is encrypted with the shared secret key corresponding to the payment module 124.

In some implementations, the device ID 1002 is a unique identifier corresponding to the payment module 124 that broadcast the information packet 1000 that included the authorization code 1004.

In some implementations, the user ID 1034 is a unique identifier associated with the user of the mobile device 104 that sent the authorization request 1030 to the server system 108.

In some implementations, the authorized amount 1046 indicates a maximum amount for which the user of the mobile device 104 is authorized to perform transaction(s) using the authorization grant token 1140. For example, the authorized amount 1046 is predefined by the user of the mobile device 104 or by the server system 108 based on a daily limit or based on the user's total account balance or based on a risk profile of the user associated with the user ID 1034.

In some implementations, the expiration period 1048 indicates an offset to the amount of time that the payment module 124 holds the authorization grant token 1040 valid for initiation of a transaction with the automatic retail machine 122 associated with the payment module 124. For example, the expiration period 1048 depends on the history and credit of the user of the mobile device 104 or a period predefined by the user of the mobile device 104.

In some implementations, the authorization grant token 1040 further includes the authorization code 1004 that was included in the authorization request 1030. In some implementations, when the authorization code 1004 is the hash value, the server system 108 encrypts the authorization grant token 1040 including the hashed value with the shared secret encryption key associated with the payment module 124. Subsequently, when the mobile device 104 sends the authorization grant token 1040 to the payment module 124 after detecting a trigger condition, the payment module 124 decrypts the authorization grant token 1040 using the secret key known only to the server system 108 and the payment module 124 (which authenticates the message and the authorization grant), and then matches the hash value included in the decrypted authorization grant token 1040 to previously broadcast valid (i.e., unexpired and un-used) hash values (e.g., stored authorization codes) to determine the validity of the hash value (which was known only by the payment module 124).

Figure 10D:
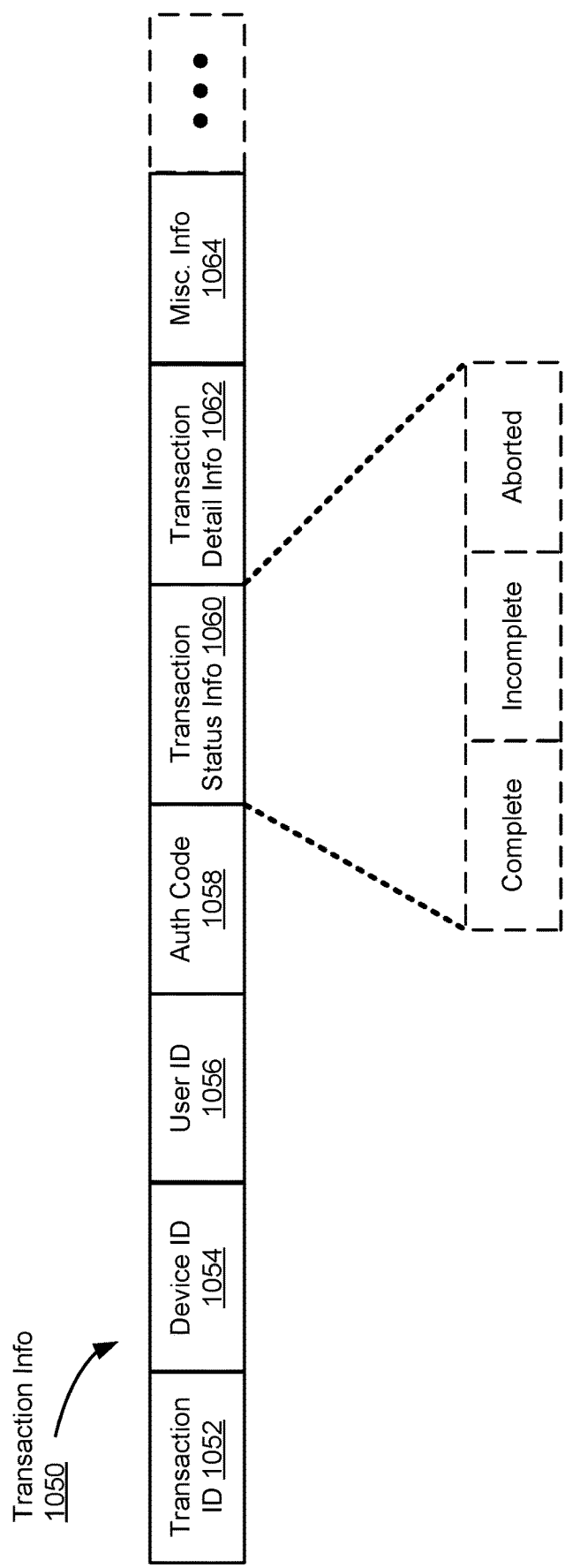
FIG. 10D is a block diagram of transaction information generated by the payment module in accordance with some implementations.

FIG. 10D is a block diagram of transaction information 1050 generated by the payment module 124 (e.g., in step 904 of the process 900 in FIG. 9) in accordance with some implementations. In some implementations, the transaction information 1050 includes: a transaction ID 1052 for the respective transaction; a device ID 1054; a user ID 1056; (optionally) the authorization code 1058; transaction status information 1060; the transaction detail information 1062; and miscellaneous information 1064. In some implementations, the transaction information 1050 is encrypted with the shared secret key corresponding to the payment module 124.

In some implementations, the transaction ID 1052 is a unique identifier corresponding to the respective transaction. In some implementations, the transaction ID 1052 is encoded based on or associated with the time and/or date on which and the location at which the respective transaction took place.

In some implementations, the device ID 1054 is a unique identifier corresponding to the payment module 124 that performed the respective transaction.

In some implementations, the user ID 1056 is an identifier associated with the user of the mobile device 104 that initiated the respective transaction.

In some implementations, the authorization code 1058 corresponds to the original authorization code (e.g., the auth code 1004, FIGS. 10A-10C) and/or authorization grant token (e.g., the auth grant token 1040, FIG. 10C) that was used to initiate the respective transaction. In some implementations, the authorization code 1056 is encrypted with a unique encryption key corresponding to the payment module 124.

In some implementations, the transaction status information 1060 includes an indication whether the respective transaction was completed, not-completed, or aborted. For example, the respective transaction is incomplete if a jam occurred at the automatic retail machine 122 and the user did not receive the product associated with the respective transaction. For example, if the user walks away from the automatic retail machine 122 after money was credited for the respective transaction, the respective transaction is aborted. In another example, if respective transaction times out after a predetermined time period because the user failed to select a product at the automatic retail machine 122, the respective transaction is aborted. In another example, if the user actuates a bill or coin return mechanism of the automatic retail machine 122, the respective transaction is aborted.

In some implementations, the transaction detail information 1062 indicates the amount of the respective transaction or the amount of each of multiple transactions (e.g., in a multi-vend scenario). In some implementations, the transaction detail information 1062 also indicates other information related to the respective transaction such as the items dispensed by the automatic retail machine 122 and the type of transaction (e.g., coins, bills, credit card, manual mode, hands-free mode, etc.).

In some implementations, the miscellaneous information 1064 includes other information related to the payment module 124 and/or the automatic retail machine 122 to which the payment module 124 is coupled. For example, the miscellaneous information 1064 includes a verification request to the server system 108 in order to implement new firmware. In another example, the miscellaneous information 1064 includes transaction information from one or more previous interrupted transactions. In another example, the miscellaneous information 1064 includes transaction information for one or more past hard currency transactions and/or other cashless transactions (e.g., paid with a credit card or bank card at the automatic retail machine 122). In another example, the miscellaneous information 1064 includes inventory information as to one or more products of the automatic retail machine 122.

Attention is now directed towards implementations of user interfaces ("UIs") and associated processes that may be implemented on a mobile device 104 with zero or more speakers 1102, zero or more microphones 1104, and a display 1106. For example, the display 1106 is a touch screen (sometimes also herein called a "touch screen display") enabled to receive one or more contacts and display information (e.g., media content, websites and web pages thereof, and/or user interfaces for application(s) 326). FIGS. 11A-11G illustrate exemplary user interfaces for facilitating displaying promotional offers in accordance with some implementations.

Although some of the examples that follow will be given with reference to inputs on a touch screen (where the touch sensitive surface and the display are combined), in some implementations, the device detects inputs on a touch-sensitive surface that is separate from the display. In some implementations, the touch sensitive surface has a primary axis that corresponds to a primary axis on the display. In accordance with these implementations, the device detects contacts with the touch-sensitive surface at locations that correspond to respective locations on the display. In this way, user inputs detected by the device on the touch-sensitive surface are used by the device to manipulate the user interface on the display of the device when the touch-sensitive surface is separate from the display. It should be understood that similar methods are, optionally, used for other user interfaces described herein.

Additionally, while the following examples are given primarily with reference to contacts (e.g., finger inputs such as finger contacts, finger tap gestures, finger swipe gestures, etc.), it should be understood that, in some implementations, one or more of the contacts are replaced with input from another input device (e.g., a mouse-based, stylus-based, or physical button-based input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact) or depression of a physical button. Similarly, when multiple user inputs are simultaneously detected, it should be understood that multiple computer mice are, optionally, used simultaneously, or a mouse and finger contacts are, optionally, used simultaneously.

FIGS. 11A-11G show user interface 1108 displayed on respective mobile device 104 (e.g., a mobile phone associated with a user) for an application associated with the payment processing system 100; however, one skilled in the art will appreciate that the user interfaces shown in FIGS. 11A-11G may be implemented on other similar computing devices. The user interfaces in FIGS. 11A-11G are used to illustrate the processes described herein, including the method described with respect to FIGS. 12A-12C. One of ordinary skill in the art will appreciate that the following user interfaces are merely examples. Moreover, one of ordinary skill in the art will appreciate that additional affordances and/or user interface elements, or that fewer affordances and/or user interface elements may be used in practice.

Figure 11A:
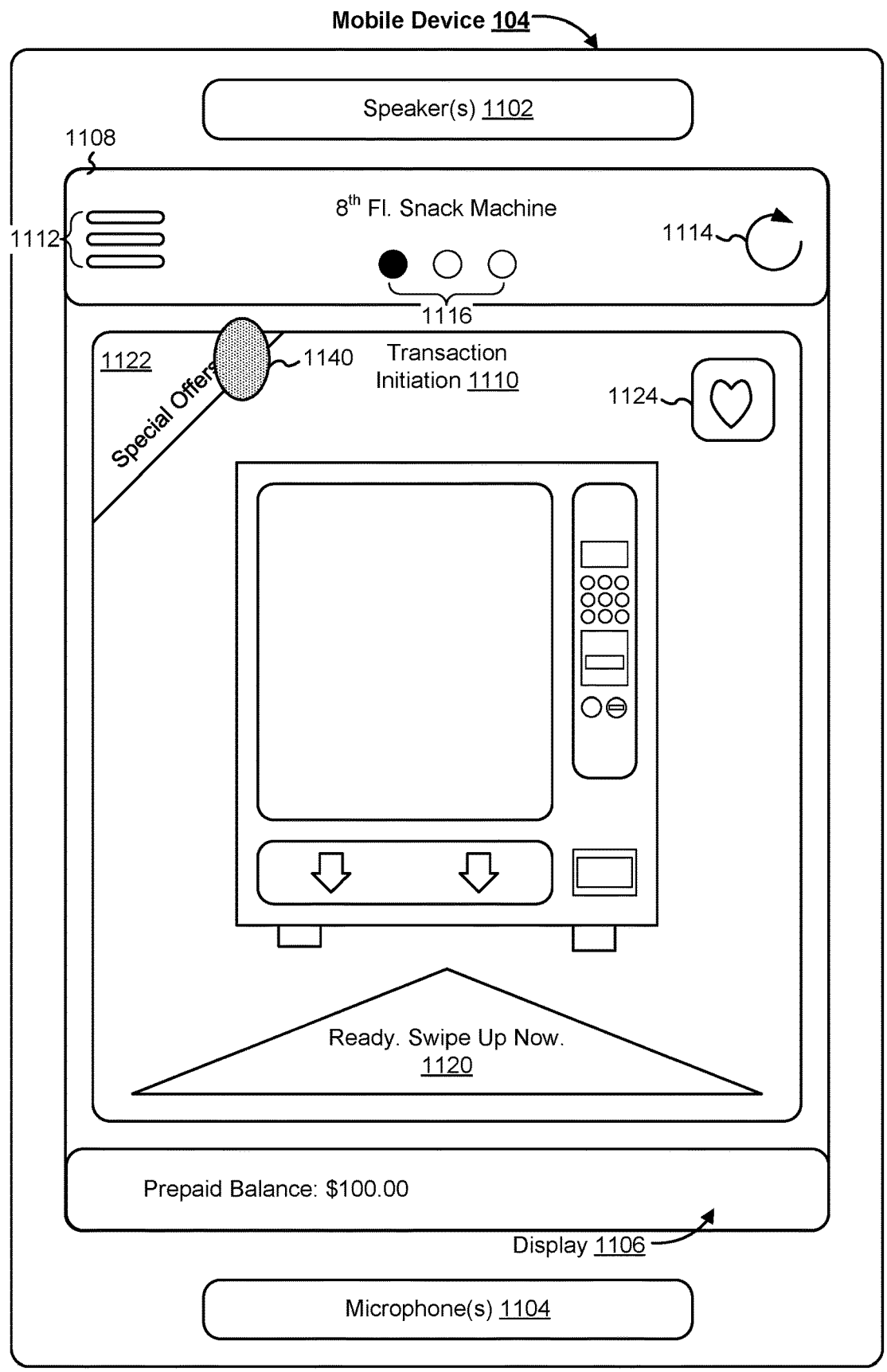
FIGS. 11A-11G illustrate exemplary user interface for displaying promotional offers in accordance with some implementations.
Figure 12A:
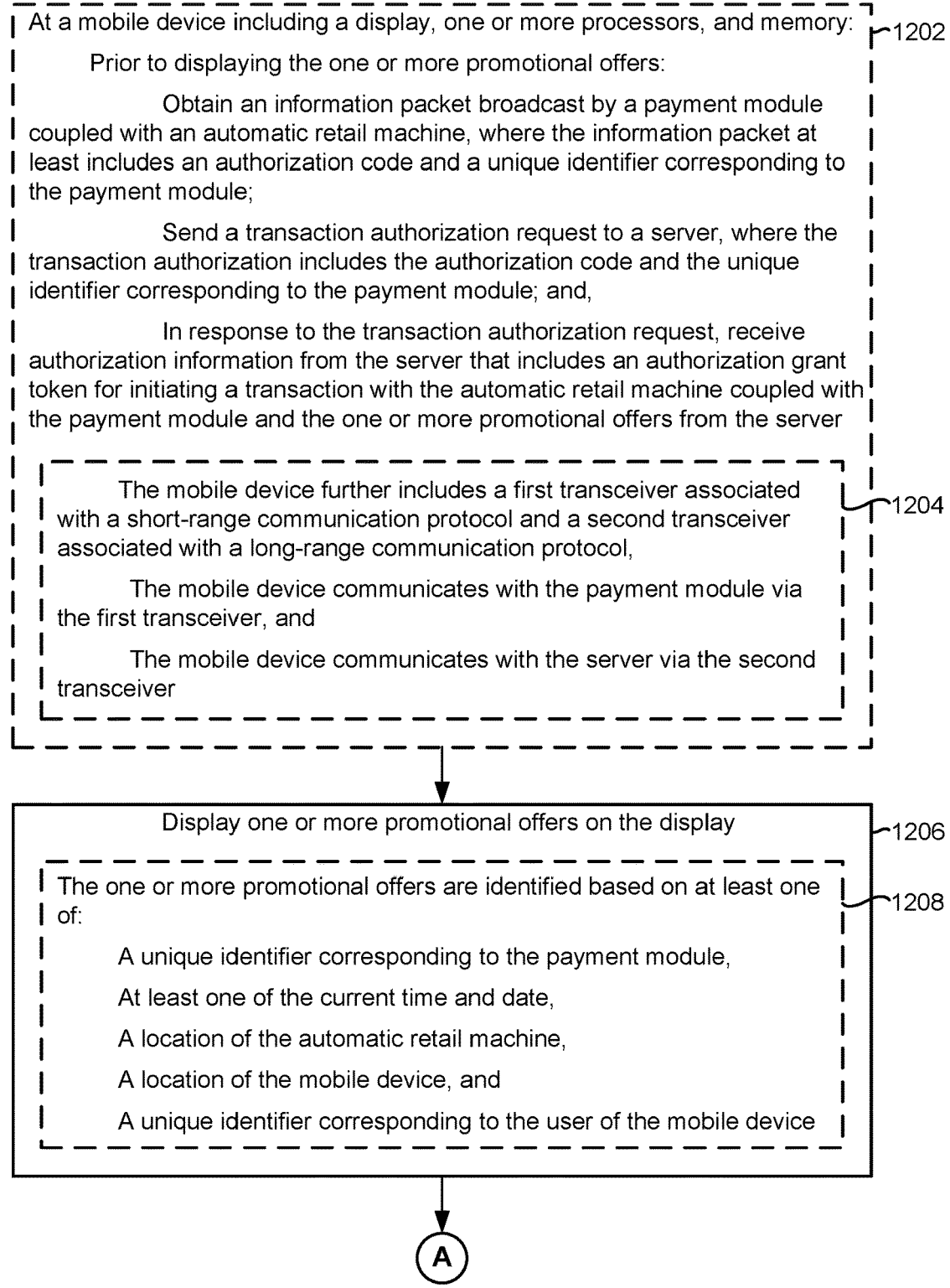
FIGS. 12A-12C illustrate a flowchart diagram of a method of providing and handling promotional offers for an automatic retail machine in accordance with some implementations.
Figure 12B:
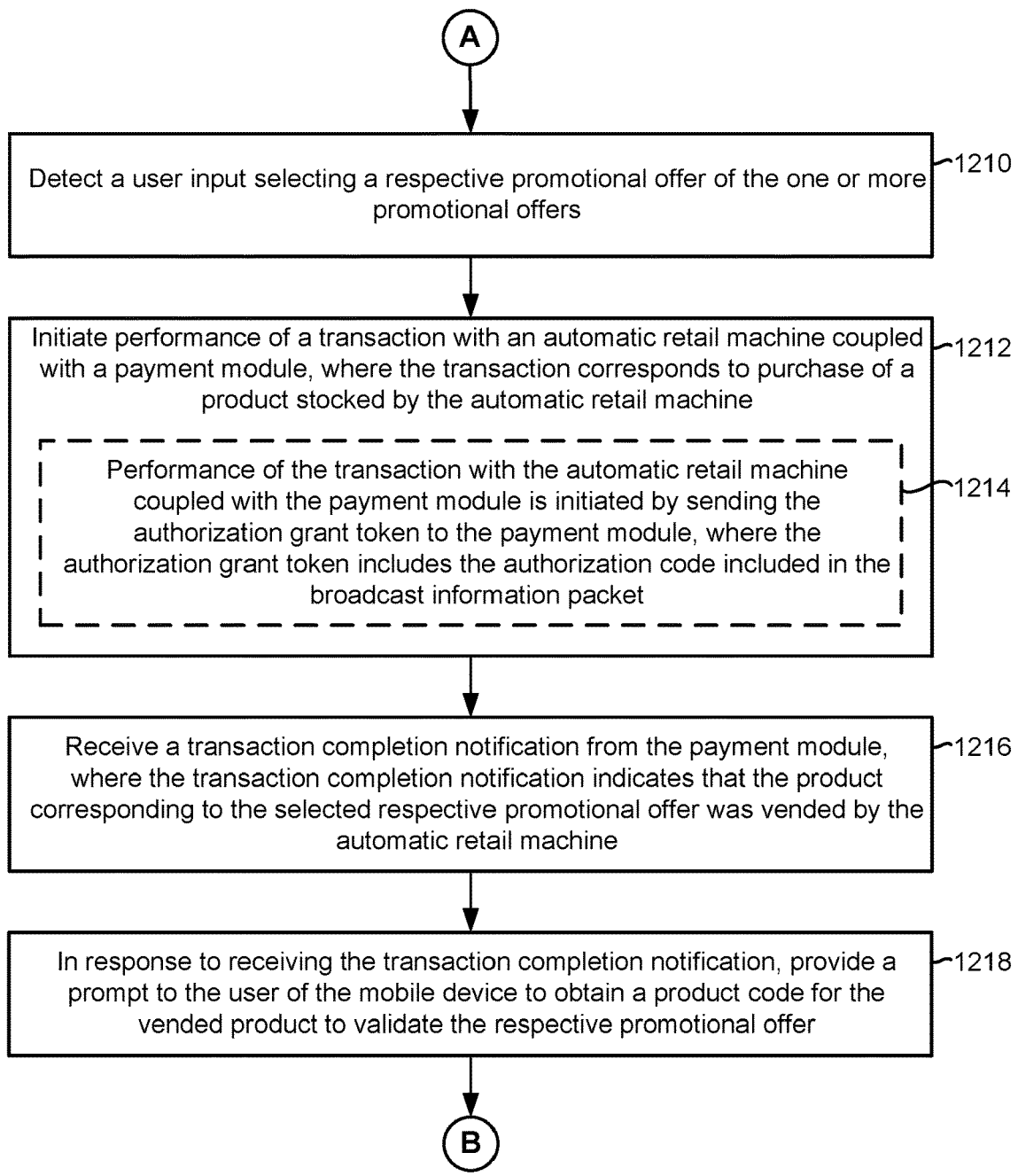
Figure 12C:
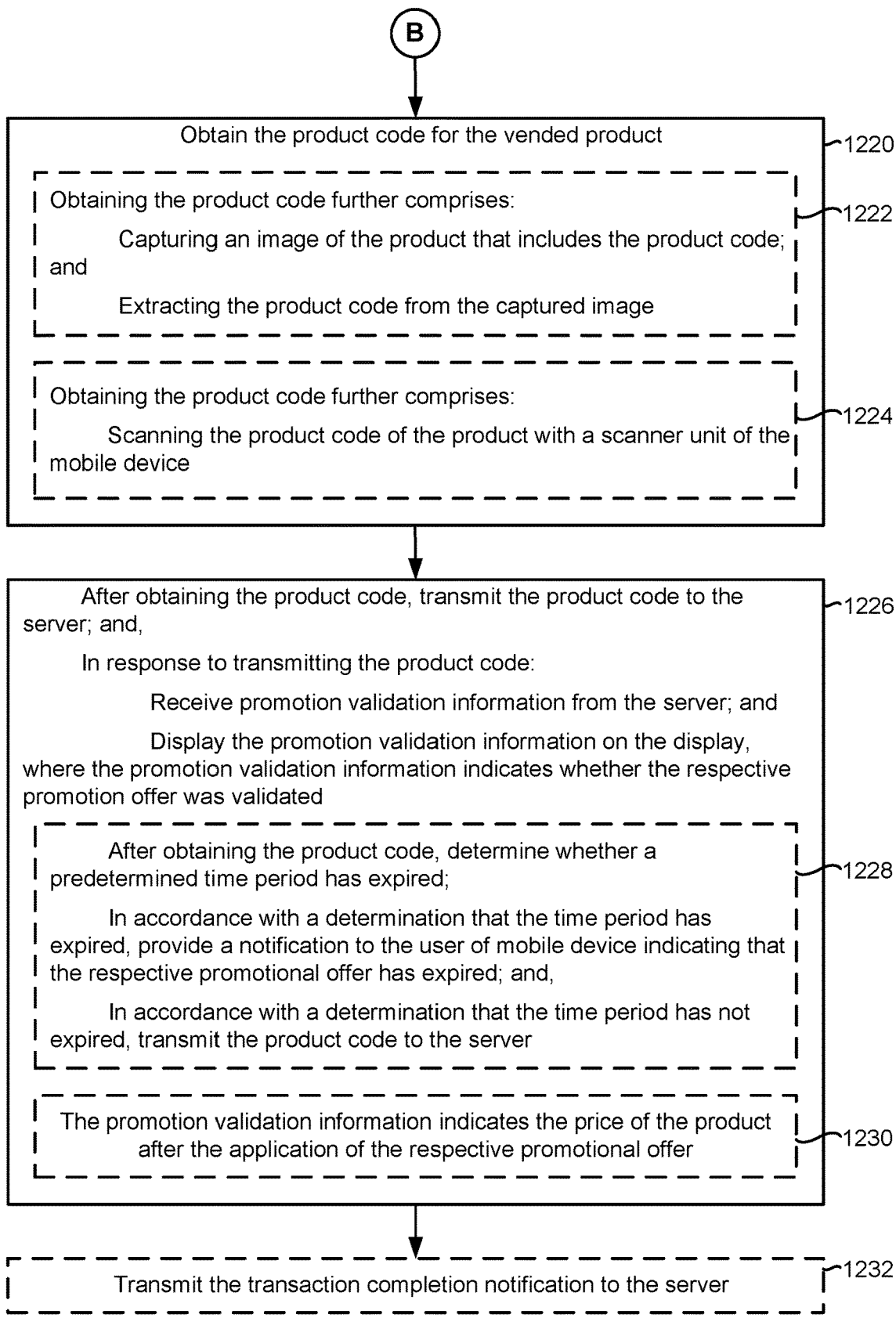

FIG. 11A illustrates the mobile device 104 displaying a transaction initiation screen 1110 for 8th floor snack machine. In FIG. 11A, the transaction initiation screen 1110 includes a sequence of indicators 1116 showing that 8th floor snack machine is one of three automatic retail machines with which the user is authorized to initiate a transaction. For example, the user of the mobile device 104 is able to access the second of the three automatic retail machines by performing a left-to-right swipe gesture on the user interface 1108 (or alternatively a right-to-left swipe gesture) and the first second the three automatic retail machines by performing a right-to-left swipe gesture on the user interface 1108 (or alternatively a left-to-right swipe gesture). The user of the mobile device 104 is able to access settings and/or a home screen of the application by selecting affordance 1112 (e.g., with a tap gesture), and the user of the mobile device 104 is able to refresh the transaction initiation screen 1110 by selecting affordance 1114 (e.g., with a tap gesture).

FIG. 11A also shows that the user of the mobile device 104 has a prepaid balance of $100.00. The user of the mobile device 104 is able to initiate a transaction with the 8th floor snack machine by performing an upward swipe gesture originating from region 1120 of the transaction initiation screen 1110. The user of the mobile device 104 is able to access special promotional offers by selecting "Special Offers" region 1122 (e.g., with a tap gesture), and the user of the mobile device 104 is able to "like" or favorite the 8th floor snack machine by selecting affordance 1124 (e.g., with a tap gesture). FIG. 11A also illustrates the mobile device 104 detecting contact 1140 at a location corresponding to "Special Offers" region 1122.

Figure 11B:
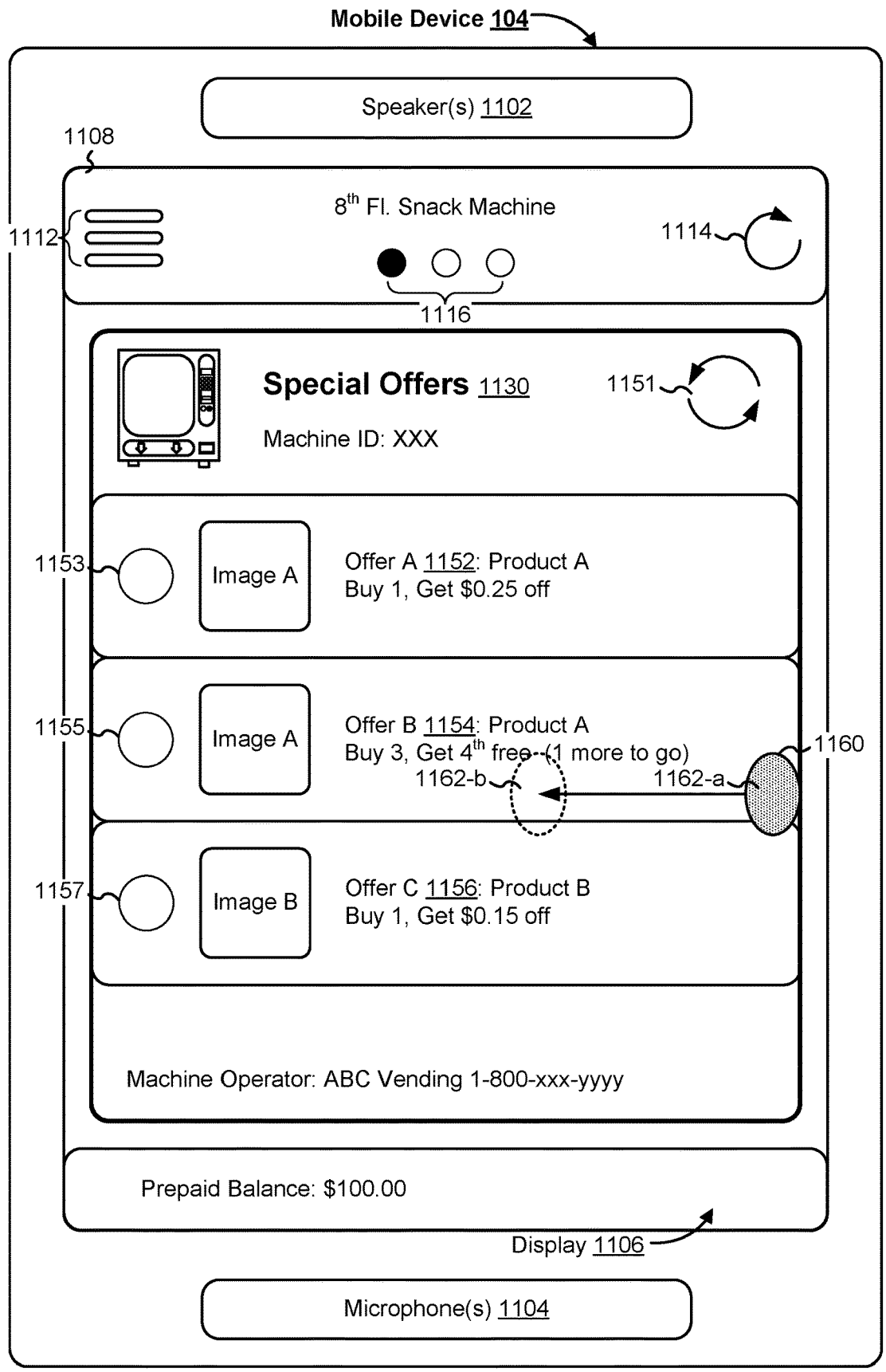

FIG. 11B illustrates the mobile device 104 displaying a special offers screen 1130 for the 8th floor snack machine. In FIG. 11B, the special offers screen 1130 includes: a first region that corresponds to "Offer A" 1152 on product A accompanied by image A of product A; a second region that corresponds to "Offer B" 1154 on product A accompanied by image A of product A; and a third region that corresponds to "Offer C" 1156 on product B accompanied by image B of product B. The special offers screen 1130 also includes refresh affordance 1151, which, when activated (e.g., via a tap gesture), causes the special offers screen 1130 to be refreshed. In FIG. 11B, none of Offers A, B, C are currently selected. The user of the mobile device 104 is able to select "Offer A" 1152 by performing a gesture (e.g., a tap gesture) on selection affordance 1153. Similarly, the user of the mobile device 104 is able to select "Offer B" 1154 by performing a gesture (e.g., a tap gesture) on selection affordance 1155 or "Offer C" 1156 by performing a gesture (e.g., a tap gesture) on selection affordance 1157. The user of the mobile device 104 is also able to dismiss or delete any of Offers A, B, or C by performing a right-to-left swipe gesture (or a left-to right swipe gesture in other implementations) in a corresponding region. FIG. 11B also illustrates the mobile device 104 detecting a right-to-left swipe gesture within the second region corresponding to "Offer B" 1154 with contact 1160 moving from a first location 1162-*a* to a second location 1162-*b*.

In some implementations, the special offers screen 1130 further includes a fourth region corresponding to "No Selected Offer." For example, the user of the mobile device 104 may view the promotional offers on the special offers screen 1130 but not wish to apply any of them to a future transaction with the 8th floor snack machine. As such, the user of the mobile device 104 may select the "No Selected Offer" region (e.g., with a tap gesture), and, in response, the mobile device 104 re-displays the transaction initiation screen 1110 as shown in FIG. 11A.

Figure 11C:
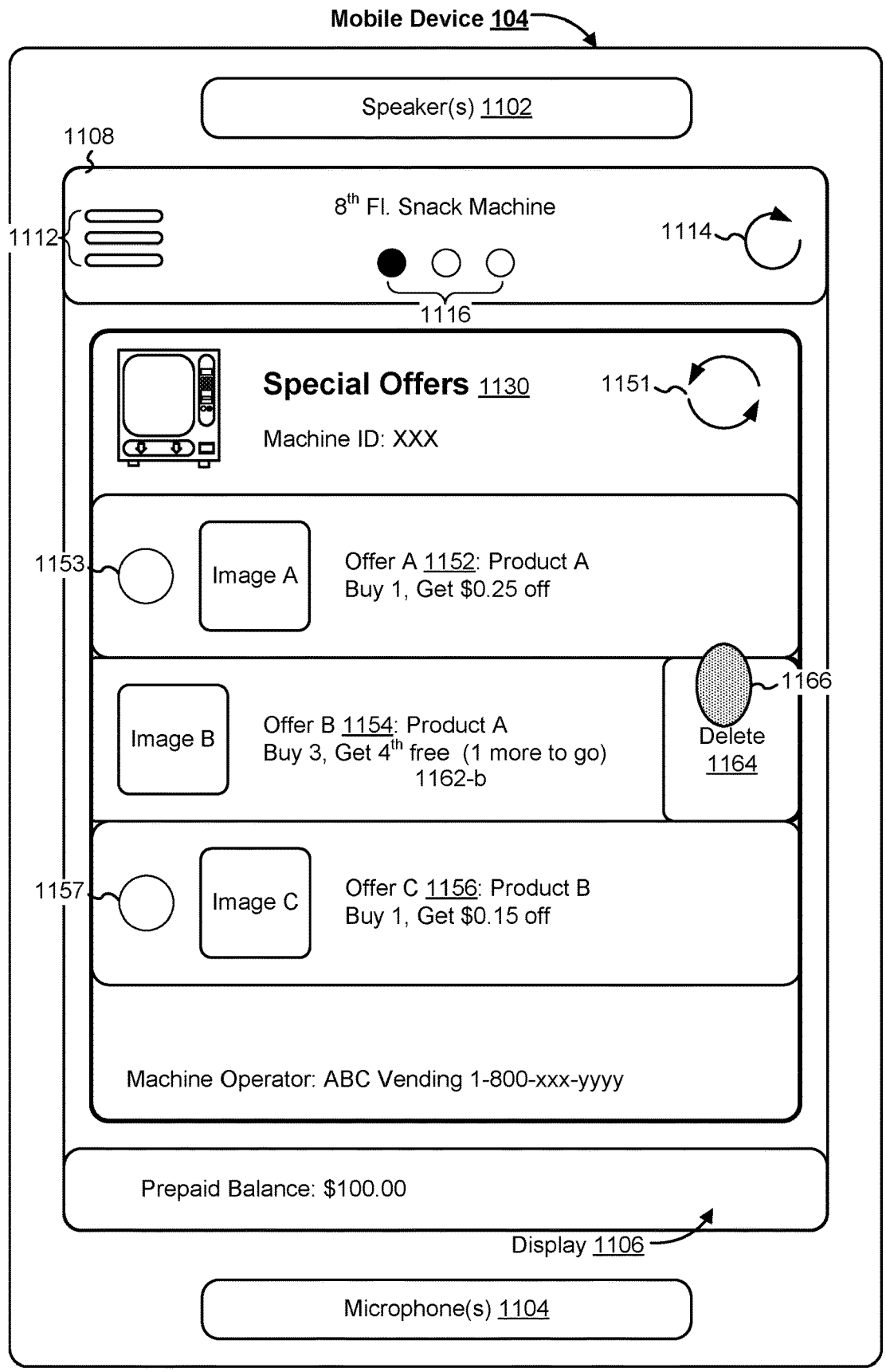

FIG. 11C illustrates the mobile device 104 displaying delete affordance 1164 within the second region corresponding to "Offer B" 1154 in response to detecting the right-to-left swipe gesture in FIG. 11B. The delete affordance 1164, when activated, (e.g., via a tap gesture), causes "Offer B" 1154 to be deleted from the special offers screen 1130. FIG. 11C also illustrates mobile device 104 detecting contact 1166 at a location corresponding to delete affordance 1164.

Figure 11D:
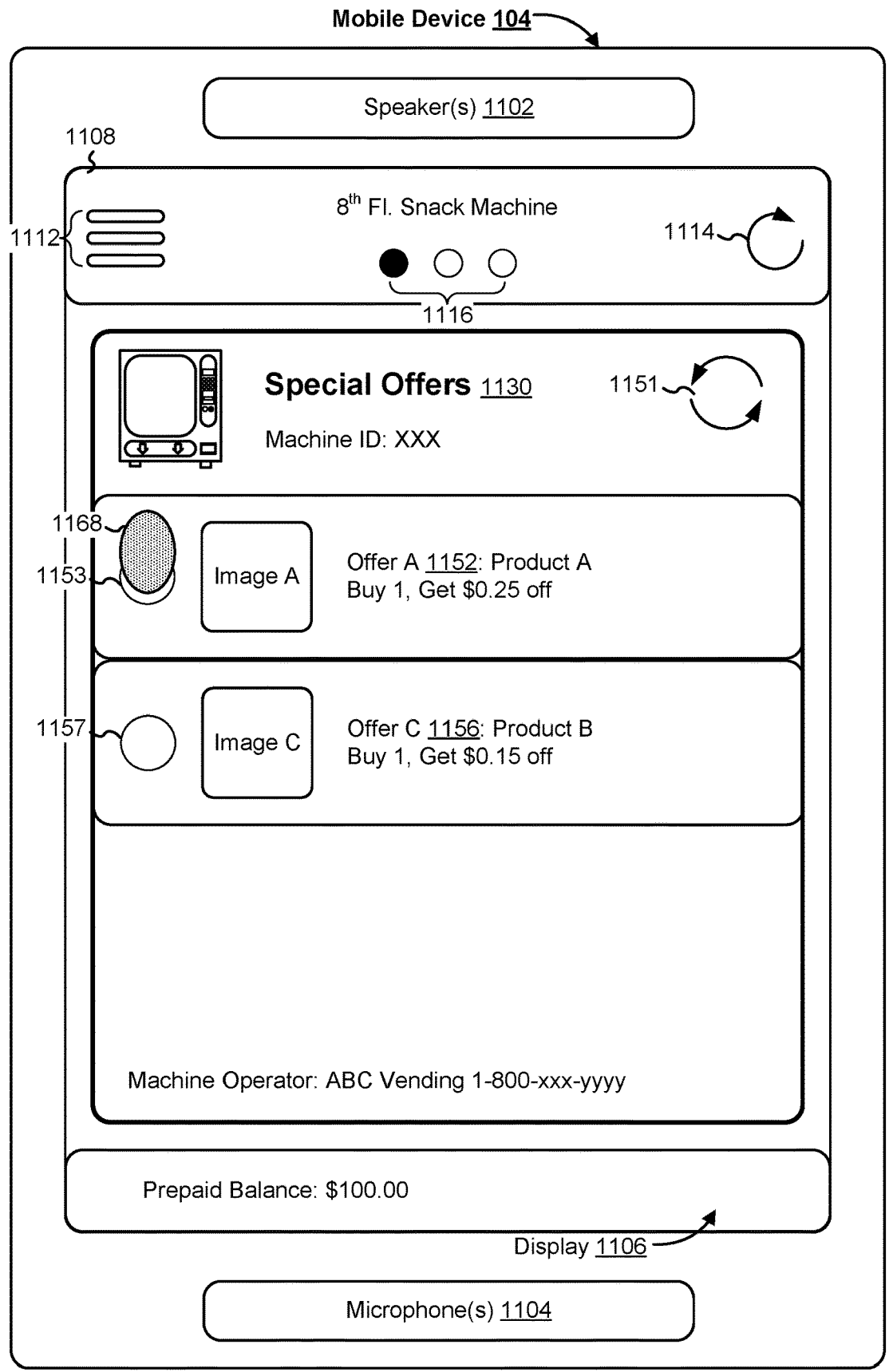

FIG. 11D illustrates the mobile device 104 ceasing to display "Offer B" 1154 within the special offers screen 1130 in response to detecting selection of delete affordance 1164 in FIG. 11C. FIG. 11D also illustrates mobile device 104 detecting contact 1168 at a location corresponding to selection affordance 1153 for "Offer A" 1152. Alternatively, in some implementations, the user of the mobile device may not wish to apply any of the offers to a future transaction with the 8th floor snack machine. As such, the user may select the affordance 1112 (e.g., with a tap gesture) or perform a predefined gesture on the special offers screen 1130 to re-display the transaction initiation screen 1110 as shown in FIG. 11A.

Figure 11E:
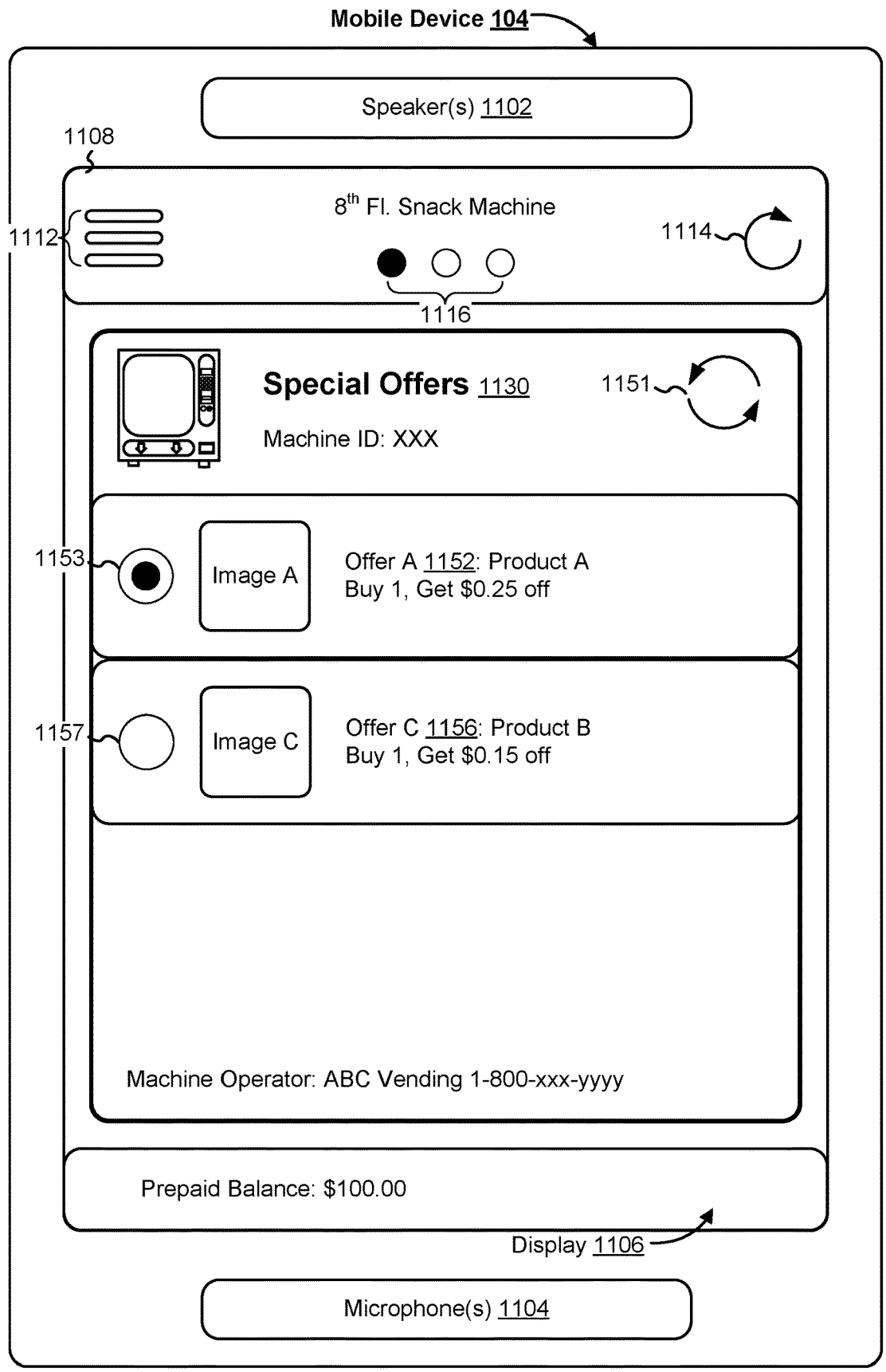

FIG. 11E shows that selection affordance 1153 is selected in response to detecting selection of selection affordance 1153 in FIG. 11D. In some implementations, a transaction with the 8th floor snack machine is automatically initiated in response to detecting selection of selection affordance 1153 in FIG. 11D. In other implementations, after detecting selection of selection affordance 1153 in FIG. 11D, the mobile device 104 re-displays the transaction initiation screen 1110 (as shown in FIG. 11A) and the transaction with the 8th floor snack machine is initiated in response to detecting upward swipe gesture originating from region 1120 of the transaction initiation screen 1110.

Figure 11F:
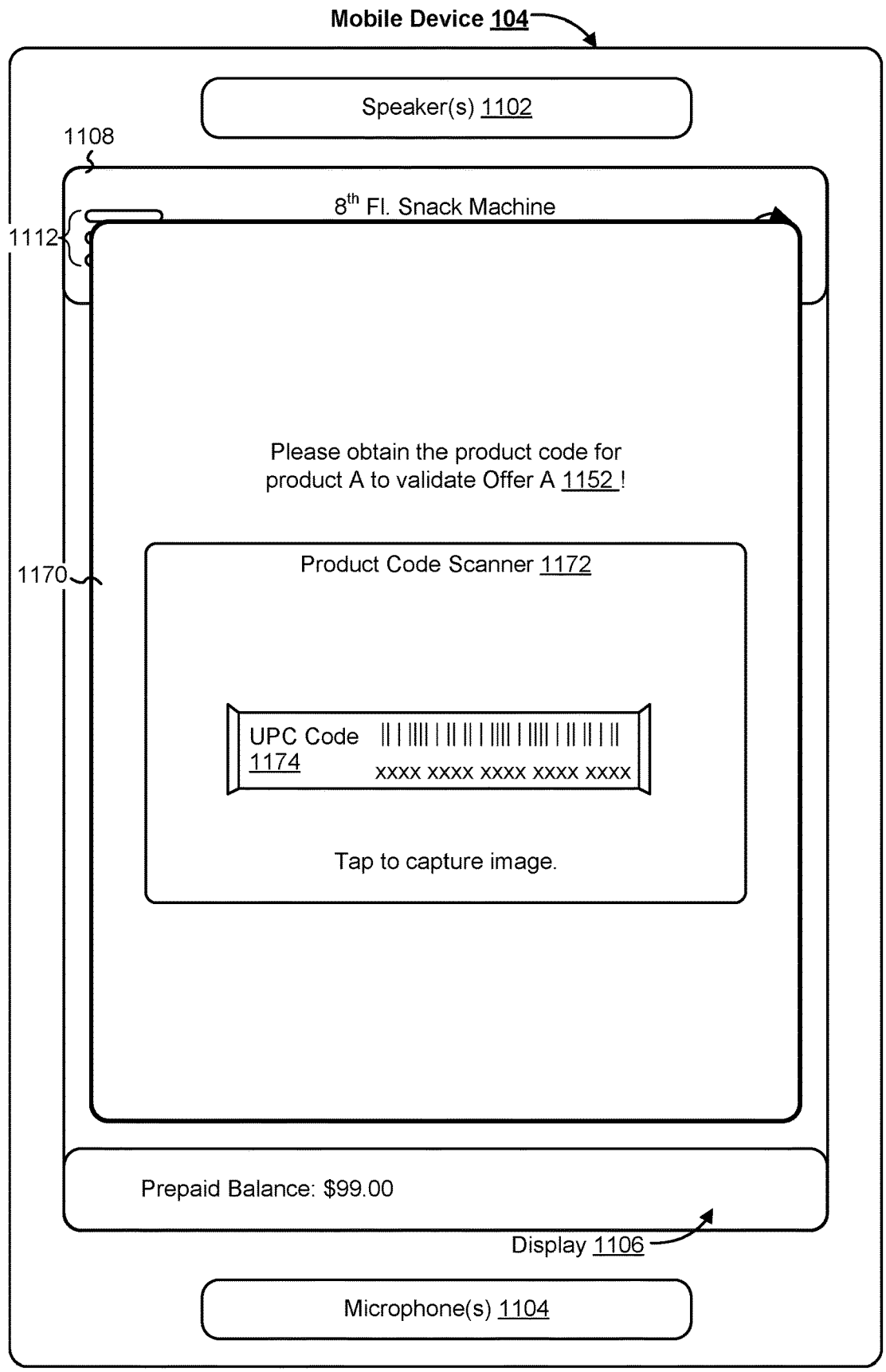

FIG. 11F illustrates the mobile device 104 displaying a product code screen 1170, which prompts the user of the mobile device 104 to obtain the product code (e.g., UPC code, SKU, or the like) for product A so as to validate Offer A" 1152 selected in FIG. 11D. The product code screen 1170 also includes a product code scanner window 1172 for capturing an image of product A and/or scanning the product code of product A. In FIG. 11F, UPC code 1174 (e.g., the product code) of product A (e.g., a candy bar), which is in the field of view of a camera of the mobile device 104, is shown within the product code scanner window 1172. For example, the user of the mobile device 104 is able to capture the image of product A (including the UPC code 1174 within the current field of view) or scan the UPC code 1174 by tapping within product code scanner window 1172, issuing an audible command, depressing a predetermined physical button of the mobile device 104, or the like. FIG. 11F also shows that the user of the mobile device 104 has a prepaid balance of $99.00, which is $1.00 less than the amount shown in FIGS. 11A-11E due to purchase of product A.

Figure 11G:
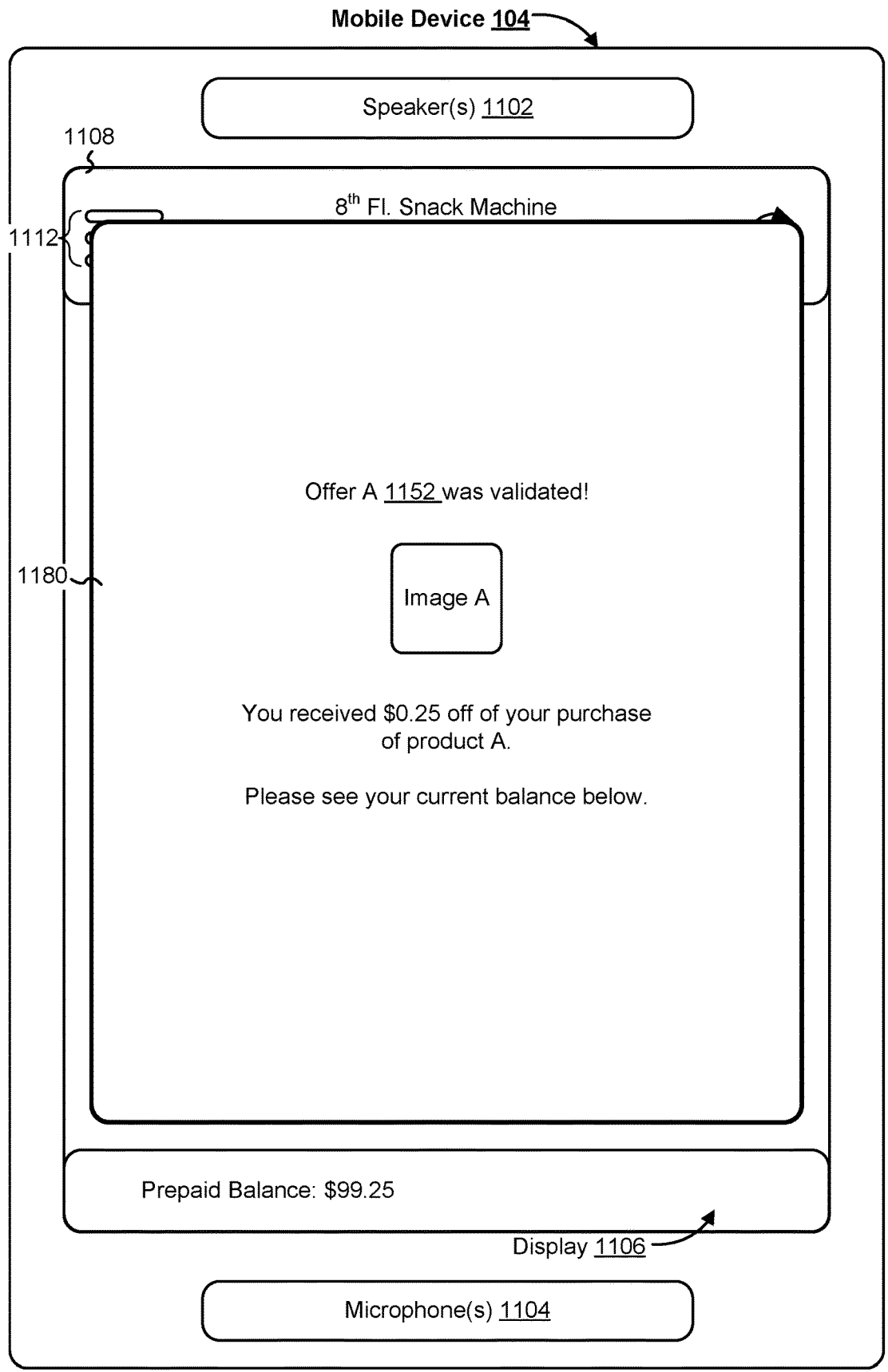

FIG. 11G illustrates the mobile device 104 displaying an offer validation screen 1180. In some implementations, the mobile device 104 displays the offer validation screen 1180 after the user completes the transaction with the 8th floor snack machine and the server validates the product code information (e.g., the UPC scanned in FIG. 11F). In FIG. 11G, the offer validation screen 1180 indicates that the "Offer A" 1152 was validated and that the user's balance was credited $0.25. FIG. 11G also shows that the user of the mobile device 104 has a prepaid balance of $99.25, which is $0.25 more than the amount shown in FIG. 11G due to validation of the "Offer A" 1152 and a credit of $0.25 for the "Offer A" 1152.

FIGS. 12A-12C illustrate a flowchart diagram of a method 1200 of providing and handling promotional offers for an automatic retail machine in accordance with some implementations. In some implementations, method 1200 is performed by a mobile device with a display, one or more processors, and memory. For example, in some implementations, method 1200 is performed by mobile device 104 (FIGS. 1-2) or a component thereof (e.g., the client-side module 102, FIGS. 1-2). In some implementations, method 1200 is governed by instructions that are stored in a non-transitory computer readable storage medium and the instructions are executed by one or more processors of the mobile device. Some operations in the method 1200 are, optionally, combined and/or the order of some operations is, optionally, changed.

In some implementations, the payment processing system 100 (FIG. 1) includes the mobile device 104, which performs the method 1200, a server system 108, and a payment module 124 coupled with an automatic retail machine 122. An instance of the client-side module 102 (e.g., as an application) is executed on the mobile device 104 as a foreground or background process to access and communicate with other devices (e.g., the server 108 and the payment module 124) in the payment processing system 100. The server 108 manages the payment processing system 100 and, in some cases, is associated with an entity that supplies, operates, and/or manufactures the payment module 124.

In some implementations, prior to displaying the one or more promotional offers, the mobile device (1202): obtains an information packet broadcast by a payment module coupled with a automatic retail machine, where the information packet at least includes an authorization code and a unique identifier corresponding to the payment module; send a transaction authorization request to a server, where the transaction authorization includes the authorization code and the unique identifier corresponding to the payment module; and, in response to the transaction authorization request, receive authorization information from the server that includes an authorization grant token for initiating a transaction with the automatic retail machine coupled with the payment module and the one or more promotional offers from the server. As discussed in the process 800, the mobile device 104 or a component thereof (e.g., the broadcast obtaining module 230, FIG. 2) receives the information packet broadcast by the payment module 124 which at least includes an authorization code and an identifier associated with the payment module 124. Subsequently, the mobile device 104 or a component thereof (e.g., the transaction authorization module 232, FIG. 2) sends the authorization code to the server 108 to pre-authorize a transaction with the automatic retail machine 122 to which the payment module 124 is coupled. In accordance with a determination that the server 108 pre-authorizes the potential transaction, the mobile device 104 or a component thereof (e.g., the transaction authorization module 232, FIG. 2) receives an authorization grant token for performing a transaction with the automatic retail machine 122. In some implementations, the mobile device 104 stores the authorization grant token (e.g., in user data 265, FIG. 2) until a trigger condition for initiating the transaction with the automatic retail machine 122 is detected (e.g., by the trigger detecting module 236, FIG. 2). In some implementations, the trigger condition is satisfied when the mobile device 104 detects a user input on the user interface displayed by the mobile device 104. For example, with reference to FIG. 11A, a transaction is initiated between the user of the mobile device 104 and the 8th floor snack machine when the mobile device 104 detects an upward swipe gesture originating from region 1120 of the user interface 1108. In another example, with reference to FIG. 11D, a transaction is initiated between the user of the mobile device 104 and the 8th floor snack machine when the mobile device 104 detects selection of Offer A 1152 with contact 1166.

In some implementations, the mobile device further includes (1204) a first transceiver associated with a short-range communication protocol and a second transceiver associated with a long-range communication protocol. The mobile device communicates with the payment module via the first transceiver, and the mobile device communicates with the server via the second transceiver. For example, the short-range communication protocol is BLE, NFC, or the like, and the long-range communication protocol is GSM, CDMA, Wi-Fi, or the like.

The mobile device displays (1206) one or more promotional offers on the display. In some implementations, the mobile device 104 only displays promotional offers for products which the user has a sufficient balance. For example, a soda costs $2.00 and there is a promotion for $0.50 off, however, the user has a balance of only $1.00. In this example, the mobile device forgoes displaying the promotion for the soda. FIG. 11B, for example, shows the mobile device 104 displaying special offers screen 1130 for the 8th floor snack machine. In FIG. 11B, the special offers screen 1130 includes: a first region that corresponds to "Offer A" 1152 on product A accompanied by image A of product A; a second region that corresponds to "Offer B" 1154 on product A accompanied by image A of product A; and a third region that corresponds to "Offer C" 1156 on product B accompanied by image B of product B. Alternatively, in some implementations, a respective one of the one or more promotional offers is applied automatically after the user completes a transaction, and the mobile device prompts the user to provide the product code corresponding to the respective promotion. In some implementations, one or more advertisements are displayed in place of the one or more selectable promotional offers.

In some implementations, one of the one or more promotional offers is a "reward" for a product or service that is not associated with the automatic retail machine 122 (i.e., an out-of-band offer). For example, if the user purchases a particular product, he/she will receive a link via email for a free download (e.g., a song, video, etc.), in-app credit (e.g., $2.00 for purchases within a digital media marketplace or a $2.00 credit for in-app purchases for a game), or the like. This may or may not require validation of product. For example, buy any product now from this machine and get a link to a $1.00 off coupon via email or text for a case of soda from a retail store. In some implementations, the offer might be an "additional sale" this is an out-of-band offer. For example, purchase XYZ Cola now, and get a case of XYZ Cola from a store for only $1.50 with a coupon to be mailed to your email address. In another example, purchase ABC Chips now, and get a special discount offer to buy a cool T-shirt for $5.00. In this example, $5.00 is added to transaction price and the user is sent an email regarding redemption and shipping of the cool the T-shirt.

In some implementations, the user is able to dismiss or delete offers and the mobile device 104 sends this information to the server 108 for analytics purposes. In one example, FIG. 11C shows the mobile device 104 displaying delete affordance 1164 within the second region corresponding to "Offer B" 1154 in response to detecting the right-to-left swipe gesture in FIG. 11B. Continuing with this example, FIG. 11D shows the mobile device 104 ceasing to display "Offer B" 1154 within the special offers screen 1130 in response to detecting selection of delete affordance 1164 in FIG. 11C.

In some implementations, the one or more promotional offers are identified (1208) based on at least one of: a unique identifier corresponding to the payment module, at least one of the current time and date, a location of the automatic retail machine, a location of the mobile device, and a unique identifier corresponding to the user of the mobile device. In some implementations, the server 108 or a component thereof (e.g., offer determining module 328, FIG. 3) determines/identifies the one or more promotional offers based on the current time/date, current location, device ID associated with the payment module, user ID associated with the user of the mobile device, and the like. In some implementations, the mobile device 104 or a component thereof (e.g., the offer(s) module 234, FIG. 2) determines/identifies the one or more promotional offers from a pre-stored collection of offers based on the current time/date, current location, device ID associated with the payment module, user ID associated with the user of the mobile device, and the like. For example, the mobile device 104 identifies the one or more promotional offers from the offers database 266 which includes offers sent by the server 108 at a prior time such as a part of an update to the application.

In some implementations, the promotional offers are identified based on the products stocked in the automatic retail machine 122 or past behavior (e.g., previous offers selected by the user, previous offers deleted by the user, previous offers not selected by the user, etc.). For example, side-by-side are separate snack and soda vending machines. The user buys a soda first. Then, when the user goes to transact with the snack machine, the user is presented with an offer for a particular product (e.g., to enable cross promotions between soda and snack distributors). Alternatively, the offers could be based on what a user did not select from the soda machine or offers that were actively deleted before.

In some implementations, the provider of the server 108 and payment module 124 manages a promotion marketplace to facilitate placing of promotional offers by manufacturers and distributors of products and to also facilitate competition between various product manufacturers and distributors. For example, a distributor or manufacturer of a product may place a promotional offer for $0.25 off on a particular item in all applicable community colleges in California on Thursdays between 2:00 and 4:00 PM PDT. In another example, a distributor or manufacturer of a product may place a promotional offer for 50% off on the product on the day the product expires (e.g., to sell perishable sandwiches or the like) for all applicable automatic retail machines. In some implementations, cross-promotional offers or complex promotional offers may also be placed whereby a user gets a credit (e.g., a rebate) for purchasing a particular drink and snack combination where each are manufactured or distributed by different entities.

In some implementations, a promotional offer on all items in automatic retail machines on a entity's campus (essentially a subsidy) is only available to select users. For example, all attorneys and staff at a law firm are given a subsidized rate on snacks but cleaning persons do not benefit from said subsidized rate. In another example, all full-time employees are given a subsidized rate on snacks but temporary workers do not benefit from said subsidized rate.

In some implementations, variable pricing is enacted whereby the base price of items changes and promotion offers may be added in addition to the variable pricing scheme. For example, a distributer wishes to decrease the price on all items in applicable machines during the off-peak hours (e.g., 9:00 PM-6:00 AM). Therefore, after a transaction is completed, the server 108 will only charge a user the decreased price, and, after the server processes and accounts for the transaction, transaction acknowledgment information displayed at the mobile device 104 will indicate that the user was only charged the decreased price and not the price shown at the automatic retail machine 122.

The mobile device detects (1210) a user input selecting a respective promotional offer of the one or more promotional offers. For example, the user input is a touch input, voice input, or the like. FIG. 11D, for example, shows the mobile device 104 detecting selection of selection affordance 1153 for "Offer A" 1152, and FIG. 11E shows that selection affordance 1153 is selected in response to detecting selection of selection affordance 1153 in FIG. 11D. In some implementations, the respective promotional offer is a negative one, such as a donation to AIDS research, that adds a selected amount to the user's next transaction. Alternatively, in some implementations, the respective promotional offer is a negative one whereby the transaction is rounded up to the nearest dollar, where additional amount is donated to a Cancer research foundation.

The mobile device initiates (1212) performance of a transaction with an automatic retail machine coupled with a payment module, where the transaction corresponds to purchase of a product stocked by the automatic retail machine. In some implementations, the transaction is initiated in response to selection of the respective promotional offer (i.e., one-click transaction initiation process). For example, a transaction with the 8th floor snack machine is automatically initiated in response to detecting selection of selection affordance 1153 in FIG. 11D. In other implementations, after the user selects an offer the user performs an action to initiate a transaction with the automatic retail machine (i.e., a two-step transaction initiation process). For example, after detecting selection of selection affordance 1153 in FIG. 11D, the mobile device 104 re-displays the transaction initiation screen 1110 (as shown in FIG. 11A) and the transaction with the 8th floor snack machine is initiated in response to detecting upward swipe gesture originating from region 1120 of the transaction initiation screen 1110.

In some implementations, performance of the transaction with the automatic retail machine coupled with the payment module is initiated (1214) by sending the authorization grant token to the payment module, where the authorization grant token includes the authorization code included in the broadcast information packet. In some implementations, initiating performance of the transaction includes the mobile device 104 or a component thereof (e.g., the transaction initiating module 238, FIG. 2) sending the stored authorization grant token to the payment module 124 for payment and the user manually selects a product using the user interface of the automatic retail machine 122. As such, the automatic retail machine 122 knows nothing about the selected promotional offer—it only knows that the user sent it a payment. For example, the automatic retail machine 122 returns transaction and product information that is passed to the mobile device 104 by the payment module 124 but it cannot determine or state in any way if it is a product that corresponds to the offer. For example, the transaction completion notification indicates "I vended E3 for $1.00".

The mobile device receives (1216) a transaction completion notification from the payment module, where the transaction completion notification indicates that the product corresponding to the selected respective promotional offer was vended by the automatic retail machine. In some implementations, the mobile device 104 or a component thereof (e.g., the transaction completion notification receiving module 240, FIG. 2) receives transaction completion notification (e.g., the transaction status information, the transaction detail information, the other miscellaneous information regarding the respective payment module 124 and/or the automatic retail machine 122 to which the respective payment module 124 is coupled, and/or the like) from the payment module 124 after the user manually selects a product using the user interface of the automatic retail machine 122. In some implementations, the transaction completion notification includes the good/service associated with the transaction, the current inventory of the automatic retail machine 122, information associated with one or more previous cash transactions, information associated with one or more interrupted transactions handled by the payment module 124, and/or other information associated with the automatic retail machine 122 such as error or maintenance states. In some implementations, the payment module 124 sends an error message in place of the transaction completion notification when the transaction is aborted or an error occurs during the transaction such as unavailability of a requested good/service or a vending jam.

In response to receiving the transaction completion notification, the mobile device provides (1218) a prompt to the user of the mobile device to obtain a product code for the vended product to validate the respective promotional offer. In some implementations, the mobile device 104 or a component thereof (e.g., the product code processing module 242, FIG. 2) displays a scanning interface for capturing the product code of the vended item after receiving the transaction completion notification. FIG. 11F, for example, shows the mobile device 104 displaying a product code screen 1170, which prompts the user of the mobile device 104 to obtain the product code (e.g., UPC code, SKU, or the like) for product A so as to validate Offer A" 1152 selected in FIG. 11D. The product code screen 1170 also includes a product code scanner window 1172 for capturing an image of product A and/or scanning the product code of product A. In FIG. 11F, the UPC code 1174 of product A (e.g., a candy bar), which is in the field of view of a camera of the mobile device 104, is shown within the product code scanner window 1172. For example, the user of the mobile device 104 is able to capture the image of product A (including the UPC code 1174 within the current field of view) or scan the UPC code 1174 by tapping within product code scanner window 1172, issuing an audible command, depressing a predetermined physical button of the mobile device 104, or the like.

In other implementations, the mobile device 104 or a component thereof (e.g., the product code processing module 242, FIG. 2) displays a pop-up message or banner notification on the display prompting the user of the mobile device 104 to manually enter or otherwise obtain the product code of the vended item. In other implementations, the mobile device 104 or a component thereof (e.g., the product code processing module 242, FIG. 2) provides an audible tone, a vocal prompt, or a sequence of tactile/haptic vibrations prompting the user of the mobile device 104 to enter or otherwise obtain the product code of the vended item.

The mobile device obtains (1220) the product code for the vended product. For example, the user enters the barcode character-by-character, scans the barcode, or simply captures an image of the barcode. In some implementations, the mobile device 104 or a component thereof (e.g., the product code processing module 242, FIG. 2) receives the product code.

In some implementations, obtaining the product code further comprises (1222): capturing an image of the product that includes the product code; and extracting the product code from the captured image. In some implementations, obtaining the product code further comprises (1224): scanning the product code of the product with a scanner unit of the mobile device. For example, the user of the mobile device 104 is able to access a product code capture plug-in from within the application associated with the payment processing system 100 (e.g., the product code processing module 242, FIG. 2) which enables the user to capture an image of the product with the product code in the field of view or scan the product code of the product. In this example, the mobile device 104 extracts the product code from the captured image and sends the extracted product code to the server 108 or, alternatively, the mobile device 104 sends the captured image to the server 108 where the product code is extracted. In another example, the user of the mobile device 104 is able to manually enter the product code from within the application (e.g., via a virtual keypad) or via a website associated with the payment processing system 100.

After obtaining the product code, the mobile device transmits (1226) the product code to the server. In response to transmitting the product code, the mobile device: receives promotion validation information from the server; and displays the promotion validation information on the display, where the promotion validation information indicates whether the respective promotion offer was validated. In some implementations, the mobile device 104 or a component thereof (e.g., the product code processing module 242, FIG. 2) either validates the obtained product code or sends the obtained product code to the server 108 for validation. In some implementations, the mobile device 104 or a component thereof (e.g., the information relaying module 244, FIG. 2) sends the transaction completion notification or a portion thereof to the server 108 regardless of whether the user follows the prompt and the mobile device 104 ultimately obtains the product code. In some implementations, the server 108 determines whether conditions for the respective promotional offer have been based on the transaction and the product code. For example, the server 108 determines whether the proper product code was obtained for the respective promotional offer, whether the respective promotional offer has expired, whether the user has fulfilled a buy N items get one free condition, whether the user has fulfilled cross-promotion condition, and/or the like. In some implementations, the offer is validated and applied by the server 108 to the user's account.

In some implementations, the mobile device 104 of a component thereof (e.g., the offer validation module 246, FIG. 2) receives and displays the promotion validation information. For example, the promotion validation information indicates whether the offer was validated and an updated user balance/transaction listing. FIG. 11G, for example, shows the mobile device 104 displaying an offer validation screen 1180, which indicates that the "Offer A" 1152 was validated and that the user's balance was credited $0.25. FIG. 11G also shows that the user of the mobile device 104 has a prepaid balance of $99.25, which is $0.25 more than the amount shown in FIG. 11G due to validation of the "Offer A" 1152 and a credit of $0.25 for the "Offer A" 1152. For example, when the user gets a fifth purchased product free and the product that was the subject of the instant transaction was only the first item purchased, the promotion validation information indicates that the user must buy 3 more of the product before he/she gets a free product. In some implementations, the promotion validation information includes a coupon for a product or service that is not associated with the automatic retail machine 122 For example, the user is emailed a coupon for $5 off an amusement park for purchasing a soda.

In some implementations, after obtaining the product code, the mobile device determines (1228) whether a predetermined time period has expired. In accordance with a determination that the time period has expired, the mobile device provides a notification to the user of mobile device indicating that the respective promotional offer has expired. In accordance with a determination that the time period has not expired, the mobile device transmits the product code to the server. In some implementations, the predetermined time period corresponds to the time between (A) initiating performance of the transaction or prompting for the product code, (B) obtaining the product code or some other time period. For example, the mobile device 104 must receive the product code within 5 minutes of the prompt or within 5 minutes of initiation of the transaction. In some implementations, this may occur hours or even days later. In some implementations, a predetermined proximity between a first location where the transaction was initiated and a second location where the product code was obtained is used in addition to or in place of the predetermined time period.

In some implementations, the application associated with the payment processing system 100 has a coupon plug-in whereby the user of the mobile device 104 is able to scan a coupon after completing a transaction for a product and also scan the product code of the product to get a post hoc rebate for the transaction.

In some implementations, the promotion validation information indicates (1230) the price of the product after the application of the respective promotional offer. For example, the mobile device 104 displays the total deducted from the user's account or charged to the user's linked bank card after application of the promotional offer to the base purchase price included in the notification completion information. FIG. 11G, for example, shows that the user of the mobile device 104 has a prepaid balance of $99.25, which is $0.25 more than the amount shown in FIG. 11G due to validation of the "Offer A" 1152 and a credit of $0.25 for the "Offer A" 1152.

In some implementations, the mobile device transmits (1232) the transaction completion notification to the server. In some implementations, the mobile device 104 or a component thereof (e.g., the information relaying module 244, FIG. 2) sends the transaction completion notification (e.g., the transaction status information, the transaction detail information, the other miscellaneous information regarding the respective payment module 124 and/or the automatic retail machine 122 to which the respective payment module 124 is coupled, and/or the like) or a portion thereof to the server 108 prior to sending the product code or along with the product code. In some implementations, the transaction completion notification or a portion thereof is sent to the server 108 regardless of whether the user follows the prompt and the mobile device ultimately obtains the product code.

It should be understood that the particular order in which the operations in FIGS. 12A-12C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., the processes 800 and 900) are also applicable in an analogous manner to method 1200 described above with respect to FIGS. 12A-12C.

While particular implementations are described above, it will be understood it is not intended to limit the application to these particular implementations. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method, comprising:
   at a mobile device including a display, one or more processors, a communications unit, and memory:
   identifying a retail machine configured for wireless communications;
   transmitting via the communications unit of the mobile device an identifier corresponding to the retail machine to a server and receiving from the server an electronic communication including one or more promotional offers for products offered by the retail machine;
   displaying on the display of the mobile device the one or more promotional offers;
   detecting selection of a respective promotional offer of the one or more promotional offers;
   receiving, via the communications unit, notification information from the retail machine associated with provision of a product by the retail machine for a user of the mobile device;
   in response to receiving the notification information associated with the provision of the product by the retail machine:
   capturing, with a camera or scanner of the mobile device, an image or scan of the product provided by the retail machine, the image or scan including a product code of the product provided by the retail machine; and
   transmitting to the server via the communications unit of the mobile device the product code of the product provided by the retail machine and the notification information associated with the provision of the product; and
   in response to transmitting the product code and the notification information to the server:
   receiving, via the communications unit, promotion validation information from the server indicating validation of the respective promotional offer of the one or more promotional offers; and
   based on the promotion validation information, displaying on the display information confirming application of the respective promotional offer.

2. The method of claim 1, wherein the product that was provided is part of a transaction associated with the user of the mobile device, and further wherein the promotion validation information includes promotion validation information with respect to the transaction.

3. The method of claim 2, wherein the one or more promotional offers are displayed within a first user interface for an application executing on the mobile device.

4. The method of claim 3, wherein the promotion validation information is displayed within a second user interface for the application executing on the mobile device.

5. The method of claim 4, wherein displaying the promotion validation information includes displaying an indication as to whether the respective promotional offer was validated and displaying information identifying a credit to the user associated with the respective promotional offer.

6. The method of claim 1, further comprising, before detecting selection of a respective promotional offer, receiving the one or more promotional offers based at least in part on particular products offered by the retail machine.

7. The method of claim 6, wherein selecting the one or more promotional offers is further based at least in part on at least one previous transaction completed by the user at a different retail machine that is distinct from the retail machine.

8. The method of claim 1, wherein the selected respective promotional offer is associated with both a time-based condition that is satisfied by using the selected respective promotional offer within a predetermined time period and a product-based condition that is satisfied by determining that the product provided by the retail machine qualifies for the selected respective promotional offer.

9. The method of claim 8, wherein the promotion validation information includes an indication as to whether (i) the time-based condition and (ii) the product-based condition were satisfied.

10. The method of claim 1, further comprising:
    while displaying on the display of the mobile device the one or more promotional offers, detecting a request from the user to dismiss a particular promotional offer of the one or more promotional offers; and
    in response to detecting the request: (i) ceasing to display the particular promotional offer on the display and (ii) sending, via the communications unit, information indicating that the user dismissed the particular promotional offer.

11. The method of claim 1, further comprising:
    after receiving the notification information, determining whether a predetermined time period has expired;
    in accordance with a determination that the predetermined time period has expired, providing a communication to the user of the mobile device indicating that the respective promotional offer has expired; and
    in accordance with a determination that the predetermined time period has not expired, transmitting the product code and the notification information to the server.

12. The method of claim 1, further comprising:
    prior to displaying on the display of the mobile device the one or more promotional offers:
    obtaining an information packet broadcast by the retail machine, wherein the information packet at least includes an authorization code and a unique identifier corresponding to the retail machine;

sending a transaction authorization request to the server, wherein the transaction authorization includes the authorization code and the unique identifier corresponding to the retail machine; and in response to the transaction authorization request, receiving from the server: (i) authorization information that includes an authorization grant token for initiating a transaction with the retail machine, and (ii) the one or more promotional offers.

13. The method of claim 12, further comprising, before receiving the notification information, initiating performance of a transaction with the retail machine by sending the authorization grant token to the retail machine, wherein the authorization grant token includes the authorization code included in the information packet.

14. The method of claim 13, wherein the transaction is initiated in response to detecting the selection of the respective promotional offer.

15. The method of claim 1, further comprising, in response to receiving the notification information:

providing a prompt instructing the user of the mobile device to confirm that the product was provided; and capturing the image or scan in response to the prompt.

16. The method of claim 15, wherein the product code is a universal product code (UPC) corresponding to the product, and obtaining the product code comprises capturing, with a camera of the mobile device, an image of the product that includes the UPC.

17. The method of claim 15, wherein the product code is a universal product code (UPC) corresponding to the product, and obtaining the product code comprises scanning, with a scanner of the mobile device, an area of the product that includes the UPC.

18. The method of claim 1, wherein the one or more promotional offers are based at least in part on the identifier corresponding to the retail machine.

19. A mobile device, comprising:

a display;

a communications unit;

one or more processors; and memory storing one or more programs to be executed by the one or more processors, the one or more programs comprising instructions for:

identifying a retail machine configured for wireless communications;

transmitting via the communications unit of the mobile device an identifier corresponding to the retail machine to a server and receiving from the server an electronic communication including one or more promotional offers for products offered by the retail machine;

displaying on the display of the mobile device the one or more promotional offers;

detecting selection of a respective promotional offer of the one or more promotional offers;

receiving, via the communications unit, notification information from the retail machine associated with provision of a product by the retail machine for a user of the mobile device;

in response to receiving the notification information associated with the provision of the product by the retail machine:

capturing, with a camera or scanner of the mobile device, an image or scan of the product provided by the retail machine, the image or scan including a product code of the product provided by the retail machine; and transmitting to the server via the communications unit of the mobile device the product code of the product provided by the retail machine and the notification information associated with the provision of the product; and in response to transmitting the product code and the notification information to the server:

receiving, via the communications unit, promotion validation information from the server indicating validation of the respective promotional offer of the one or more promotional offers; and based on the promotion validation information, displaying on the display information confirming application of the respective promotional offer.

20. A non-transitory computer readable storage medium storing one or more programs, the one or more programs comprising instructions, which, when executed by a mobile device with a display, a communications unit, and one or more processors, cause the mobile device to perform the functions of:

identifying a retail machine configured for wireless communications;

transmitting via the communications unit of the mobile device an identifier corresponding to the retail machine to a server and receiving from the server an electronic communication including one or more promotional offers for products offered by the retail machine;

displaying on the display of the mobile device the one or more promotional offers;

detecting selection of a respective promotional offer of the one or more promotional offers;

receiving, via the communications unit, notification information from the retail machine associated with provision of a product by the retail machine for a user of the mobile device;

in response to receiving the notification information associated with the provision of the product by the retail machine:

capturing, with a camera or scanner of the mobile device, an image or scan of the product provided by the retail machine, the image or scan including a product code of the product provided by the retail machine; and transmitting to the server via the communications unit of the mobile device the product code of the product provided by the retail machine and the notification information associated with the provision of the product; and in response to transmitting the product code and the notification information to the server:

receiving, via the communications unit, promotion validation information from the server indicating validation of the respective promotional offer of the one or more promotional offers; and based on the promotion validation information, displaying on the display information confirming application of the respective promotional offer.

* * * * *